(12) United States Patent
Hiraiwa et al.

(10) Patent No.: US 9,136,552 B2
(45) Date of Patent: Sep. 15, 2015

(54) GAS DECOMPOSITION COMPONENT, AMMONIA DECOMPOSITION COMPONENT, POWER GENERATION APPARATUS, ELECTROCHEMICAL REACTION APPARATUS, AND METHOD FOR PRODUCING GAS DECOMPOSITION COMPONENT

(75) Inventors: Chihiro Hiraiwa, Osaka (JP); Masatoshi Majima, Itami (JP); Tetsuya Kuwabara, Osaka (JP); Tomoyuki Awazu, Itami (JP); Toshio Ueda, Itami (JP); Toshiyuki Kuramoto, Itami (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 203 days.

(21) Appl. No.: 13/702,221

(22) PCT Filed: Jun. 6, 2011

(86) PCT No.: PCT/JP2011/062886
§ 371 (c)(1),
(2), (4) Date: Dec. 5, 2012

(87) PCT Pub. No.: WO2011/155422
PCT Pub. Date: Dec. 15, 2011

(65) Prior Publication Data
US 2013/0084514 A1   Apr. 4, 2013

(30) Foreign Application Priority Data

Jun. 7, 2010 (JP) .................................. 2010-130551
Jun. 7, 2010 (JP) .................................. 2010-130555
Jun. 10, 2010 (JP) .................................. 2010-133029

(51) Int. Cl.
*H01M 8/12* (2006.01)
*H01M 8/02* (2006.01)
(Continued)

(52) U.S. Cl.
CPC ............. *H01M 8/122* (2013.01); *B01D 53/326* (2013.01); *C25B 1/00* (2013.01); *C25B 9/00* (2013.01);
(Continued)

(58) Field of Classification Search
CPC ... H01M 8/1213; H01M 8/122; H01M 8/124; H01M 8/0252
USPC ................. 429/535, 480, 498, 492, 508, 432; 204/278, 262, 263
See application file for complete search history.

(56) References Cited

U.S. PATENT DOCUMENTS 3,228,797 A * 1/1966 Brown et al. .................. 429/498
3,527,689 A * 9/1970 Taylor ........................... 204/278
(Continued)

FOREIGN PATENT DOCUMENTS

CN    101440499 A    5/2009
CN    101649464 A    2/2010
(Continued)

OTHER PUBLICATIONS

Machine Translation of: JP 2006/294285A, Watanabe et al., Oct. 26, 2006.*

*Primary Examiner* — Kenneth Douyette
(74) *Attorney, Agent, or Firm* — Drinker Biddle & Reath LLP

(57) ABSTRACT

Provided are a gas decomposition component in which an electrochemical reaction is used to reduce the running cost and high treatment performance can be achieved; and a method for producing the gas decomposition component. The gas decomposition component includes a cylindrical MEA 7 including an anode 2 on an inner-surface side, a cathode 5 on an outer-surface side, and a solid electrolyte 1 sandwiched between the anode and the cathode; a porous metal body 11s that is inserted on the inner-surface side of the cylindrical MEA and is in contact with the first electrode; and a central conductive rod 11k inserted so as to serve as an electrically conductive shaft of the porous metal body 11s.

23 Claims, 18 Drawing Sheets

(51) Int. Cl.
*B01D 53/32* (2006.01)
*C25B 1/00* (2006.01)
*C25B 9/00* (2006.01)
*C25B 11/02* (2006.01)
*C25B 13/02* (2006.01)
*C25B 9/10* (2006.01)

(52) U.S. Cl.
CPC . *C25B 9/10* (2013.01); *C25B 11/02* (2013.01); *C25B 13/02* (2013.01); *H01M 8/0252* (2013.01); *H01M 8/124* (2013.01); *H01M 8/1213* (2013.01); *B01D 2255/104* (2013.01); *B01D 2255/20707* (2013.01); *B01D 2255/20738* (2013.01); *B01D 2255/20753* (2013.01); *B01D 2257/404* (2013.01); *B01D 2257/406* (2013.01); *B01D 2257/708* (2013.01); *B01D 2258/0216* (2013.01); *Y02E 60/521* (2013.01); *Y02E 60/525* (2013.01); *Y10T 29/49108* (2015.01)

(56) References Cited

U.S. PATENT DOCUMENTS

| | | | | |
|---|---|---|---|---|
| 5,458,989 | A * | 10/1995 | Dodge | 429/492 |
| 2004/0175604 | A1 * | 9/2004 | Ito et al. | 429/30 |
| 2005/0255375 | A1 | 11/2005 | Xie | |
| 2007/0166603 | A1 * | 7/2007 | Nakanishi et al. | 429/44 |
| 2008/0152987 | A1 * | 6/2008 | Nakashima et al. | 429/34 |
| 2008/0274390 | A1 | 11/2008 | Ueda et al. | |
| 2010/0136460 | A1 * | 6/2010 | Shibata et al. | 429/508 |
| 2011/0177407 | A1 * | 7/2011 | Majima et al. | 429/422 |
| 2013/0089806 | A1 | 4/2013 | Hiraiwa et al. | |
| 2013/0089810 | A1 | 4/2013 | Hiraiwa et al. | |

FOREIGN PATENT DOCUMENTS

| | | |
|---|---|---|
| JP | 53-11185 | 2/1978 |
| JP | 54-10269 | 1/1979 |
| JP | 57-187020 | 11/1982 |
| JP | 61-68120 | 4/1986 |
| JP | 7-31966 | 2/1995 |
| JP | 7-116650 | 5/1995 |
| JP | 11-347535 | 12/1999 |
| JP | 2001-518688 A | 10/2001 |
| JP | 2003-45472 | 2/2003 |
| JP | 2004-332047 | 11/2004 |
| JP | 2006-175376 | 7/2006 |
| JP | 2006-231223 | 9/2006 |
| JP | 2006294285 A | 10/2006 |
| JP | 2008-063032 A | 3/2008 |
| JP | 2010-100929 A | 5/2010 |
| JP | 2010-140895 A | 6/2010 |
| JP | 2010159472 A | 7/2010 |
| JP | 2010-172828 A | 8/2010 |
| JP | 2010-180789 A | 8/2010 |
| WO | 2010/035691 | 4/2010 |

* cited by examiner

CYLINDRICAL MEA

11a

11a

OUTER CIRCUMFERENTIAL
SURFACE OF CATHODE

GAS DECOMPOSITION COMPONENT, AMMONIA DECOMPOSITION COMPONENT, POWER GENERATION APPARATUS, ELECTROCHEMICAL REACTION APPARATUS, AND METHOD FOR PRODUCING GAS DECOMPOSITION COMPONENT

TECHNICAL FIELD

The present invention relates to a gas decomposition component, an ammonia decomposition component, a power generation apparatus, an electrochemical reaction apparatus, and a method for producing a gas decomposition component; specifically, to a gas decomposition component that can efficiently decompose a predetermined gas, particularly, an ammonia decomposition component that can decompose ammonia, a power generation apparatus based on a gas decomposition reaction, and an electrochemical reaction apparatus.

BACKGROUND ART

Although ammonia is an essential compound in agriculture and industry, it is hazardous to humans and hence a large number of methods for decomposing ammonia in water and the air have been disclosed. For example, a method for removing ammonia through decomposition from water containing ammonia at a high concentration has been proposed: aqueous ammonia being sprayed is brought into contact with airflow to separate ammonia into the air and the ammonia is brought into contact with a hypobromous acid solution or sulfuric acid (Patent Literature 1). Another method has also been disclosed: ammonia is separated into the air by the same process as above and the ammonia is incinerated with a catalyst (Patent Literature 2). Another method has also been proposed: ammonia-containing wastewater is decomposed with a catalyst into nitrogen and water (Patent Literature 3). Disclosed catalysts for ammonia decomposition reactions are, for example, porous carbon particles containing a transition metal component, a manganese composition, an iron-manganese composition (Patent Literature 3); a chromium compound, a copper compound, a cobalt compound (Patent Literature 4); and platinum held in a three-dimensional network alumina structure (Patent Literature 5). Use of methods in which ammonia is decomposed by chemical reactions employing such catalysts can suppress generation of nitrogen oxides $NO_x$. Methods have also been proposed in which manganese dioxide is used as a catalyst to thereby promote efficient thermal decomposition of ammonia at 100° C. or less (Patent Literatures 6 and 7).

In general, waste gas from semiconductor fabrication equipment contains ammonia, hydrogen, and the like. To completely remove the odor of ammonia, the amount of ammonia needs to be reduced to the ppm order. For this purpose, a method has been commonly used in which waste gas to be released from semiconductor fabrication equipment is passed through scrubbers so that water containing chemicals absorbs the hazardous gas. On the other hand, to achieve a low running cost without supply of energy, chemicals, or the like, a treatment for waste gas from semiconductor fabrication equipment has been proposed: ammonia is decomposed with a phosphoric acid fuel cell (Patent Literature 8).

CITATION LIST

Patent Literature

PTL 1: Japanese Unexamined Patent Application Publication No. 7-31966
PTL 2: Japanese Unexamined Patent Application Publication No. 7-116650
PTL 3: Japanese Unexamined Patent Application Publication No. 11-347535
PTL 4: Japanese Unexamined Patent Application Publication No. 53-11185
PTL 5: Japanese Unexamined Patent Application Publication No. 54-10269
PTL 6: Japanese Unexamined Patent Application Publication No. 2006-231223
PTL 7: Japanese Unexamined Patent Application Publication No. 2006-175376
PTL 8: Japanese Unexamined Patent Application Publication No. 2003-45472

SUMMARY OF INVENTION

Technical Problem

As described above, ammonia can be decomposed by, for example, the method of using a chemical solution such as a neutralizing agent (PTL 1), the incineration method (PTL 2), or methods employing thermal decomposition reactions with catalysts (PTLs 3 to 7). However, these methods have problems that they require chemicals and external energy (fuel) and also require periodic replacement of the catalysts, resulting in high running costs. In addition, such an apparatus has a large size and, for example, it may be difficult to additionally install the apparatus in existing equipment in some cases.

The apparatus in which a phosphoric acid fuel cell is used to detoxify ammonia in waste gas from compound semiconductor fabrication has also a problem: since the electrolyte is liquid, the size of air-side and ammonia-side separators cannot be reduced and it is difficult to reduce the size of the apparatus. In addition, as for the apparatus (PTL 8), intensive efforts are not made for addressing an increase in pressure loss, an increase in electric resistance, and the like, which inhibit enhancement of the detoxification capability. When an electrochemical reaction is used to detoxify ammonia or the like, unless a novel structure is used to suppress, for example, an increase in pressure loss and an increase in electric resistance between electrode/collector under high-temperature environments, high treatment performance on the practical level cannot be achieved. Thus, the apparatus has still remained just an idea.

An object of the present invention is to provide a gas decomposition component that employs an electrochemical reaction to reduce the running cost and provides a small apparatus having high treatment performance; in particular, an ammonia decomposition component for ammonia; a power generation apparatus including a power generation component among the above-described decomposition components; an electrochemical reaction apparatus; and a method for producing a gas decomposition component.

Solution to Problem

A gas decomposition component according to the present invention is used for decomposing a gas. This component includes a cylindrical-body membrane electrode assembly (MEA) including a first electrode on an inner-surface side, a second electrode on an outer-surface side, and a solid electrolyte sandwiched between the first electrode and the second electrode; a porous metal body that is inserted on the inner-surface side of the cylindrical-body MEA and is electrically connected to the first electrode; and a central conductive rod inserted so as to serve as an electrically conductive shaft of the porous metal body.

In the above-described configuration, the collector for the first electrode includes the porous metal body and the central conductive rod. On the inner-surface side of the cylindrical body, in general, a gas to be detoxified such as ammonia is introduced. A gaseous fluid containing the gas to be detoxified is introduced from an external gaseous-fluid transfer passage, through an inlet on the inner-surface side of the MEA, to the first electrode. The portion of the inlet on the inner-surface side of the MEA needs to have high airtightness.

On the other hand, in a cylindrical MEA containing a solid electrolyte, the route through which the materials of the first-electrode collector are placed needs to pass through the inlet. The connection to the external wiring needs to be established through the gaseous-fluid inlet or a portion near the inlet. Providing, in a portion of the cylindrical MEA other than such portions, the route through which the materials of the first-electrode collector are placed involves considerable disadvantages such as reduction of the area for the electrochemical reaction and an increase in the risk of gas leakage. Thus, in addition to the introduction from the gaseous-fluid transfer passage, wiring for current collection passes through an end portion of the cylindrical MEA.

The central conductive rod is a single solid rod and hence has high rigidity, stably maintains its shape without easily deforming under stress to a degree, and is also easy to process. Accordingly, an end portion of the central conductive rod can be easily processed by grooving, threaded-hole formation, or the like for establishing an electrical connection to the external wiring. Thus, for example, a connection terminal having a low contact resistance can be easily disposed at an end portion of the central conductive rod. The electric resistance between the central conductive rod and the porous metal body increases at the contact interface between (porous metal body/central conductive rod). However, the interface between the porous metal and the outer surface of the central conductive rod is formed by spirally winding a sheet-shaped porous metal body; when tightening in the winding is strongly performed, since highly conductive metals are brought into contact with each other, an electric-resistance increase on the problematic level is not caused in the interface resistance.

In contrast, when current collection for the first electrode is performed with porous metal only (a central conductive rod in the present invention is not used), for example, in a cylindrical porous metal body formed by spirally winding a porous metal sheet, (D1) it is very difficult to converge an end portion of the spiral porous metal body. Accordingly, it is not easy to form, in the end portion, a compact structure for connection to the external wiring while the above-described high airtightness is maintained. Irrespective of cylindrical shape or spiral shape, a porous-metal end portion tends to deform and is less likely to be converged; and hence the structure for electrical connection to the outside inevitably has a large size.

In addition, a bigger problem is (D2) a high contact resistance due to electrical connection to the external wiring. Even when an intra-tube (intra-cylindrical-MEA) connection member is disposed between the external wiring and an end having the above-described shape in the porous metal body, it is difficult to establish electrical connection having a low electric resistance at the end portion.

In summary, it is difficult to practically address both (D1) and (D2) above.

In a configuration according to the present invention, since the central conductive rod is used as described above, the electric resistance can be decreased and an end portion of the cylindrical MEA in which the gaseous-fluid transfer passage and the external wiring are concentrated can be converged to a compact size. That is, a small and simple structure can be provided. As a result, the electric resistance in the "first electrode/first-electrode collector (including porous metal body and central conductive rod)/external wiring" can be decreased. As a result, an electrochemical reaction for gas decomposition can be promoted to enhance the treatment performance. Thus, size reduction of an apparatus including a gas decomposition component can be promoted.

In general, such electrochemical reactions proceed at a practical reaction rate at high temperatures. Thus, the MEA needs to be heated with a heater or the like to a temperature range of 600° C. to 1000° C. The electric-power cost for this heating is incurred, though it is low with respect to the above-described chemicals and the like. However, the operation does not require chemicals and the like and the running cost is low.

As to this high-temperature heating, the central conductive rod further provides the following advantage. At the above-described heating temperatures, it is difficult for common resins to maintain its durability such as strength. Accordingly, at positions close to the main stream of the thermal flow from the heater, use of a resin that is considerably special and expensive is necessary to ensure sufficient safety. However, in the above-described central conductive rod, the portion for electrical connection to the external wiring can be easily disposed so as to extend to a position that is separated from the main stream of the thermal flow. When the central conductive rod itself cannot be formed so as to have a large length, an extension member can be easily attached to an end of the central conductive rod. Thus, while the body portion of the MEA is heated to the above-described temperatures, the portion connected to the external wiring and the portion connected to the gaseous-fluid transfer passage can be kept at temperatures considerably lower than the above-described temperature range. As a result, in the end portions of the MEA, the durability of various connection members can be enhanced and the necessity of use of expensive special materials has been eliminated. Thus, the cost efficiency can be increased.

As for a usage example for a reaction in which ammonia is decomposed with oxygen in the air, the gaseous fluid supplied to the second electrode may be the air; the electrochemical reaction in this ammonia decomposition results in power generation and hence the generated electric power can be supplied to the heater. Accordingly, several tens of percent of the electric power required for heating with the heater can be covered by the electric power generated in the ammonia decomposition reaction.

Note that, in the above-described ammonia decomposition, the first electrode is an anode and the second electrode is a cathode; however, in a gas decomposition component according to the present invention, in general, the first electrode may be an anode or a cathode and the second electrode is correspondingly an electrode that constitutes a pair with the first electrode.

The above-described central conductive rod is preferably a single-phase or composite-phase metal rod in which at least a surface layer does not contain Cr. In this case, while degradation of the reactivity of the first electrode and the like due to Cr poisoning is suppressed, a suitable central conductive rod can be provided in accordance with, for example, the specification of the gas decomposition component.

The following configuration may be employed: the solid electrolyte extends beyond both ends of the cylindrical-body MEA, a tubular joint is engaged with each of ends of the cylindrical solid electrolyte, the tubular joint is connected to a transfer passage for a gaseous fluid containing the gas supplied to the first electrode, and a conductive member is electrically connected to the central conductive rod and penetrates the tubular joint. In this case, the connection between the gaseous-fluid transfer passage and the first-electrode collector (such as the porous metal body and the central conductive rod) can be achieved in a compact size while the cylindrical MEA is kept airtight. The connection to the gaseous-fluid transfer passage can be achieved with a connection mechanism allowing airtight connection. As for the penetration of the conductive member through the tubular joint, the conductive member preferably penetrates the material of the tubular joint while the airtightness is maintained. In this case, to prevent generation of gaps and the like in the tubular joint, a gap-filling agent or the like is preferably used.

The above-described tubular joint may be formed of a resin having heat resistance and corrosion resistance. Even when the central conductive rod is used to decrease the temperature at the position of the tubular joint, the temperature is still higher than normal temperature. Accordingly, in the case where the above-described resin is used, even under a corrosive gas environment, the tubular joint has sufficient durability to stably maintain airtightness.

The first electrode and/or the second electrode may be a sinter containing an ion-conductive ceramic and metal chain particles mainly containing nickel (Ni). The metal chain particles denote an elongated moniliform metal substance in which metal particles are connected together. The metal is preferably Ni, Fe-containing Ni, Ni containing a trace amount of Ti, or Fe-containing Ni containing a trace amount of Ti. When the surface of Ni or the like is oxidized, the surfaces of the metal chain particles are oxidized while the contents (portions inside the surface layers) are not oxidized and have metal conductivity. Accordingly, for example, when ions moving through the solid electrolyte are anions (the ions may be cations) and (A1) the first electrode (anode) is formed so as to contain metal chain particles, in the anode, the chemical reaction between the anions moving through the solid electrolyte and gas molecules in a gaseous fluid introduced into the anode from the outside thereof is promoted (catalysis) with the oxide layers of the metal chain particles and the chemical reaction in the anode is also promoted (promotion effect due to charges) through participation of the anions. As a result of the chemical reaction, conductivity of generated electrons can be ensured in the metal portions of the metal chain particles. As a result, the electrochemical reaction accompanying giving and receiving of charges in the anode can be promoted on the whole. When the first electrode (anode) contains metal chain particles, in the anode, cations such as protons are generated and the cations move through the solid electrolyte to the cathode to thereby similarly provide the above-described promotion effect due to charges.

Note that, prior to use, the oxide layers of the metal chain particles are formed by sintering with certainty; however, during use, the oxide layers are often eliminated by the reduction reaction. Even when the oxide layers are eliminated, the above-described catalysis is not eliminated though it may reduce. In particular, Ni that contains Fe or Ti has high catalysis in spite of the absence of the oxide layers.

(A2) When the second electrode (cathode) is formed so as to contain the metal chain particles, in the cathode, the chemical reaction of gas molecules in a gaseous fluid introduced into the cathode from the outside thereof is promoted (catalysis) with the oxide layers of the metal chain particles; and electron conductivity from the external circuit is enhanced and, through participation of the electrons, the chemical reaction in the cathode is also promoted (promotion effect due to charges). Thus, anions are efficiently generated from the molecules and can be sent to the solid electrolyte.

As with (A1), in (A2), the electrochemical reaction among cations having moved through the solid electrolyte, electrons having flowed through the external circuit, and the second gaseous fluid can be promoted. Accordingly, as in the case where the anode contains the metal chain particles, the electrochemical reaction accompanying giving and receiving of charges in the cathode can be promoted on the whole. Whether the cathode is formed so as to contain the metal chain particles or not depends on the gas to be decomposed.

(A3) When the anode and the cathode are formed so as to contain the metal chain particles, the above-described effects in (A1) and (A2) can be obtained.

The metal chain particles will be described in embodiments according to the present invention below.

The rates of the above-described electrochemical reactions are often limited by the speed at which ions move through the solid electrolyte or the time for which ions move through the solid electrolyte. To increase the movement speed of ions, the gas decomposition component is generally equipped with a heating unit such as a heater and heated at a high temperature such as 600° C. to 1000° C. By the heating to a high temperature, in addition to an increase in the movement speed of ions, chemical reactions accompanying giving and receiving of charges in the electrodes can be promoted.

When the ions moving through the solid electrolyte are anions, as described above, the anions are generated by the chemical reaction in the cathode and supplied. The anions are generated in the cathode through the reaction between molecules of a fluid introduced and electrons. The generated anions move through the solid electrolyte to the anode. The electrons participating in the cathode reaction move from the external circuit (including a capacitor, a power supply, and a power consumption device) connecting the anode and the cathode. When the ions moving thorough the solid electrolyte are cations, the cations are generated by the electrochemical reaction in the anode and move through the solid electrolyte to the cathode. Electrons are generated in the anode and flow through the external circuit to the cathode and participate in the electrochemical reaction in the cathode.

The electrochemical reactions may be power generation reactions of a fuel cell or may be electrolytic reactions.

The solid electrolyte may have oxygen-ion conductivity or proton conductivity.

As for oxygen-ion conductivity, a large number of solid electrolytes are known and well-proven.

When an oxygen-ion-conductive solid electrolyte is used, for example, a reaction between electrons and oxygen molecules is caused to generate oxygen ions in the cathode, the oxygen ions move through the solid electrolyte, and the predetermined electrochemical reaction can be caused in the anode. In this case, since the speed at which the oxygen ions move through the solid electrolyte is not higher than that of protons, to achieve a decomposition capacity on the practical level, for example, the following expedients are required: a sufficiently high temperature is provided and/or the thickness of the solid electrolyte is made sufficiently small.

On the other hand, as proton-conductive solid electrolytes, barium zirconate ($BaZrO_3$) and the like are known. When a proton-conductive solid electrolyte is used, for example, ammonia is decomposed in the anode to generate protons, nitrogen molecules, and electrons; the protons move through the solid electrolyte to the cathode and react with oxygen in the cathode to generate water ($H_2O$). Protons are smaller than oxygen ions and hence move through the solid electrolyte at a higher speed than oxygen ions. Accordingly, at a lower heating temperature, a decomposition capacity on the practical level can be achieved.

For example, when ammonia is decomposed with a cylindrical-body MEA in which an anode is disposed inside thereof and an oxygen-ion-conductive solid electrolyte is used, a reaction of generating water is caused inside the cylindrical body (in the anode). The water takes the form of water droplets at low-temperature portions near the outlet and may cause pressure loss. In contrast, when a proton-conductive solid electrolyte is used, protons, oxygen molecules, and electrons are reacted, and water is generated in the cathode (outside). Since the outside is substantially open, even when adhesion of water droplets occurs, pressure loss is less likely to be caused.

The porous metal body may be a metal-plated body. In this case, a porous metal body having a high porosity can be obtained and the pressure loss can be suppressed. In a metal-plated porous body, the skeleton part is formed by plating with metal (Ni). Accordingly, the thickness can be easily adjusted to be small and hence a high porosity can be easily achieved.

The following configuration may be employed: a first gaseous fluid is introduced into the first electrode, a second gaseous fluid is introduced into the second electrode, and electric power is output from the first electrode and the second electrode. In this case, the gas to be decomposed is used as fuel and the gas decomposition component constitutes a fuel cell to generate electric power.

The gas decomposition component may further include a heater, wherein the electric power may be supplied to the heater. In this case, gas decomposition can be performed with high energy efficiency.

An ammonia decomposition component according to the present invention includes any one of the above-described gas decomposition components, wherein a gaseous fluid containing ammonia is introduced into the first electrode and a gaseous fluid containing oxygen molecules is introduced into the second electrode.

In this case, oxygen ions generated in the second electrode (cathode) move to the first electrode (anode); the reaction between ammonia and oxygen ions is caused in the first electrode under the catalysis due to metal chain particles and the promotion effect due to ions; and electrons generated by the reaction can be rapidly moved.

The following configuration may be employed: a third gaseous fluid is introduced into the first electrode, a fourth gaseous fluid is introduced into the second electrode, and electric power is supplied to the first electrode and the second electrode. In this case, electric power is consumed to decompose the decomposition target gas. In this case, in the gas decomposition component, electrolysis of the gas in the third and fourth gaseous fluids is performed in the first electrode and the second electrode. Depending on the electrochemical relationship between a gas to be decomposed and a gaseous fluid ($NH_3$, volatile organic compounds (VOC), air (oxygen), $H_2O$, or the like) supplying ions participating in the electrochemical reaction, the selection between the electrolysis and the fuel cell is determined.

A power generation apparatus according to the present invention includes any one of the above-described gas decomposition components that outputs electric power and a power-supply part that supplies the electric power to another electric apparatus. In this case, a gas decomposition component regarded as a power generation apparatus can be used to generate electric power with, for example, a combination of gases from which only emission gas placing no load on the global environment is generated.

An electrochemical reaction apparatus according to the present invention is used for fluid (gas or liquid) and includes any one of the above-described gas decomposition components. In this case, the component will be used not only in gas detoxification but also as, for example, electrodes serving as bases of apparatuses, in fuel cells and in original electrochemical reaction apparatuses employing gas decomposition, to thereby contribute to, for example, enhancement of the efficiency of electrochemical reactions, size reduction of apparatuses, and low running costs.

A gas decomposition component according to another embodiment of the present invention includes a cylindrical-body MEA (membrane electrode assembly) including a first electrode on an inner-surface side, a second electrode on an outer-surface side, and a solid electrolyte sandwiched between the first electrode and the second electrode; a heater that heats the MEA; a porous metal body that is inserted on the inner-surface side of the cylindrical-body MEA and is electrically connected to the first electrode; a central conductive rod inserted so as to serve as an electrically conductive shaft of the porous metal body; and a metal mesh sheet inserted between the first electrode and the porous metal body, wherein the metal mesh sheet includes a portion extending beyond an end of the MEA, and the portion extending beyond the end is electrically connected to the central conductive rod.

In the above-described configuration, the collector for the first electrode has a low electric resistance and electrochemical reactions for gas decomposition are facilitated, resulting in enhancement of the gas decomposition performance.

The metal mesh sheet may have a cylindrical shape and may be disposed all over the first electrode so as to cover the first electrode. In this case, the metal mesh sheet covering the first electrode disposed on the inner surface of the cylindrical-body MEA is present between the first electrode and the porous metal body to decrease the electric resistance.

The diameter of the portion of the metal mesh sheet extending beyond the end may be reduced and the portion may be welded to an outer circumference of the central conductive rod. In this case, electrical connection between the metal mesh sheet and the central conductive rod can be easily established. The welding may be performed by any welding process such as metal inert gas (MIG) welding, tungsten inert gas (TIG) welding, or resistance welding.

The portion of the metal mesh sheet extending beyond the end may be bonded to an outer circumference of the central conductive rod by resistance welding at one or more points. In resistance welding, while the metal mesh sheet is pressed against the central conductive rod (pressure application), a current is passed through the interface therebetween to achieve bonding by the generated heat. Accordingly, welding materials, inert gases, and the like are not necessary and the bonding can be simply achieved for a short period of time while a relatively clean environment is maintained.

The metal mesh sheet may be electrically connected to the central conductive rod on an inlet side and/or an outlet side of the MEA into which a gaseous fluid containing the gas is introduced. In this case, depending on circumstances, a suitable selection can be performed.

Ni paste may be disposed between the porous metal body and the metal mesh sheet. In this case, the electric resistance can be further decreased.

The gas to be decomposed may be discharged from semiconductor fabrication equipment and may contain at least ammonia. In this case, ammonia discharged during production of compound semiconductors such as GaAs can be easily detoxified with a small-footprint compact component to the several ppm order, which gives no odor. Semiconductor fabrication equipment intermittently discharges gases and, at the peak time, discharges a large amount of ammonia. Thus, the amount of ammonia discharged considerably varies. However, the treatment performance of a gas decomposition component according to the present invention can be enhanced in accordance with the discharge amount at the peak time and the above-described detoxification can be performed.

Electric power may be output from the first electrode and the second electrode and supplied to the heater. In this case, gas decomposition can be performed with high energy efficiency. Even when the amount of power generated from the self power generation is a supplement to the electric power supplied from the outside, the running cost in terms of the electric power required for heating with the heater can be decreased.

The gas decomposition component may function as a fuel cell for supplying electric power to an external apparatus. In this case, while a hazardous gas is decomposed, power generation can be performed with the fuel cell.

A method for producing a gas decomposition component according to the present invention is used to produce a gas decomposition component in which a first electrode is disposed on an inner-surface side of a cylindrical-body MEA, and a collector for the first electrode includes a metal mesh sheet, a porous metal body, and a central conductive rod that are disposed inside the cylindrical body, the central conductive rod being inserted through the porous metal body. This production method includes a step of fixing the porous metal sheet to the central conductive rod and winding the porous metal sheet around the central conductive rod; a step of placing the metal mesh sheet having a cylindrical shape on an inner surface of the cylindrical-body MEA such that the metal mesh sheet has a portion extending beyond an end of the cylindrical-body MEA; a step of inserting the central conductive rod around which the porous metal sheet is wound, into the cylindrical-body MEA including the metal mesh sheet; a step of establishing an electrical connection between the wound porous metal body and the metal mesh sheet; and a step of electrically connecting the portion of the metal mesh sheet extending beyond the end, to the central conductive rod.

According to the above-described production method, the first-electrode collector having a low electric resistance can be formed and a gas decomposition component having sufficiently high treatment performance can be easily produced.

The portion of the metal mesh sheet extending beyond the end may be bonded to the central conductive rod by welding. In this case, the metal mesh sheet can be efficiently electrically connected to the central conductive rod.

Before the central conductive rod is inserted into the cylindrical-body MEA, Ni paste may be applied to the wound porous metal body or the metal mesh sheet that is placed in the cylindrical-body MEA such that the Ni paste is disposed between the wound porous metal body and the metal mesh sheet. In this case, the electric resistance in the first electrode/ metal mesh sheet/porous metal body can be decreased.

Advantageous Effects of Invention

A gas decomposition component according to the present invention can provide a small apparatus that has high treatment performance and can be operated at low running cost. In particular, as a result of employing, as the first-electrode collector, the combination of the central conductive rod and the porous metal body, while the electric resistance is decreased, an end portion of the cylindrical MEA can be formed as a compact structure having airtightness.

For example, in a gas decomposition component according to the present invention, the metal mesh sheet inserted for decreasing the electric resistance in the electrical connection between the first electrode and the porous metal body, has an extension portion that is electrically connected to the central conductive rod; as a result, the electric resistance in first-electrode collector can be further decreased. As a result, a small apparatus can be provided that has high gas treatment performance and can be operated at low running cost.

DESCRIPTION OF EMBODIMENTS

First Embodiment

Figure 1A:
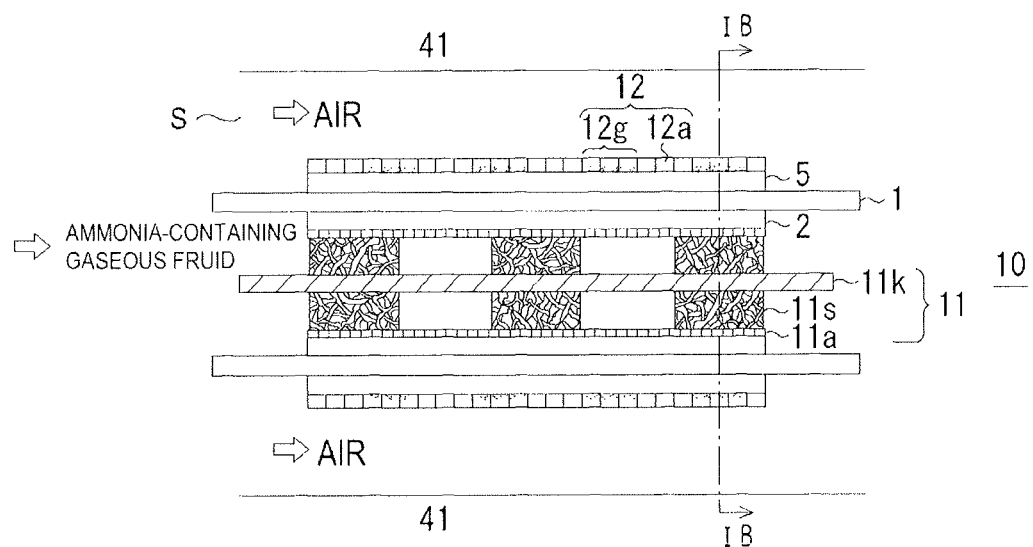
FIG. 1A is a longitudinal sectional view of a gas decomposition component according to a first embodiment of the present invention, in particular, an ammonia decomposition component.
Figure 1B:
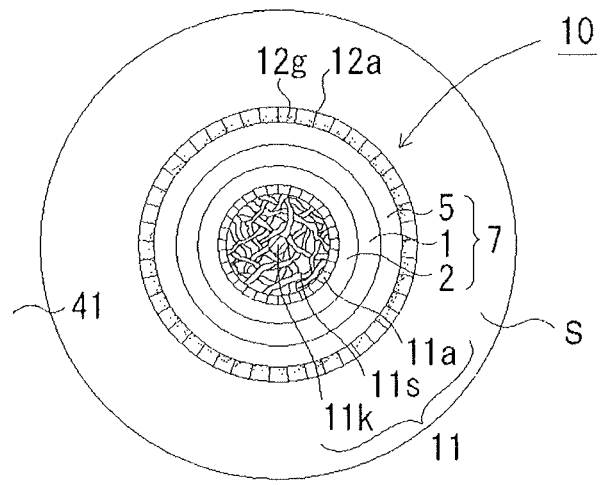
FIG. 1B is a sectional view taken along line IB-IB in FIG. 1A.

FIG. 1A is a longitudinal sectional view of a gas decomposition component serving as an electrochemical reaction apparatus according to a first embodiment of the present invention, in particular, an ammonia decomposition component 10. FIG. 1B is a sectional view taken along line IB-IB in FIG. 1A.

In the ammonia decomposition component 10, an anode (first electrode) 2 is disposed so as to cover the inner surface of a cylindrical solid electrolyte 1; a cathode (second electrode) 5 is disposed so as to cover the outer surface of the cylindrical solid electrolyte 1; thus, a cylindrical MEA 7 (1, 2, 5) is formed. The anode 2 may be referred to as a fuel electrode. The cathode 5 may be referred to as an air electrode. In general, the cylindrical body may have a winding shape such as a spiral shape or a serpentine shape; in FIG. 1, the cylindrical body is a right-cylindrical MEA 7. Although the cylindrical MEA has an inner diameter of, for example, about 20 mm, the inner diameter is preferably varied in accordance with apparatuses to which the MEA is applied. In the ammonia decomposition component 10 according to the present embodiment, an anode collector 11 is disposed so as to be in the inner cylinder of the cylindrical MEA 7 or so as to fill the inner cylinder. A cathode collector 12 is disposed so as to surround the outer surface of the cathode 5. The collectors will be described below.

<Anode Collector 11>: Ni Mesh Sheet 11a/Porous Metal Body 11s/Central Conductive Rod 11k.

A Ni mesh sheet 11a is in contact with the anode 2 disposed on the inner-surface side of the cylindrical MEA 7, to conduct electricity through a porous metal body 11s to a central conductive rod 11k. The porous metal body 11s is preferably a metal-plated body, which can be formed so as to have a high porosity, such as Celmet (registered trademark: Sumitomo Electric Industries, Ltd.) for the purpose of decreasing the pressure loss of an ammonia-containing gaseous fluid described below. On the inner-surface side of the cylindrical MEA, it is important that, while the overall electric resistance of the collector 11 formed of a plurality of members is made low, the pressure loss in the introduction of a gaseous fluid on the anode side is made low.

<Cathode Collector 12>: Silver-Paste-Coated Wiring 12g+Ni Mesh Sheet 12a

A Ni mesh sheet 12a is in contact with the outer surface of the cylindrical MEA 7 to conduct electricity to the external wiring. Silver-paste-coated wiring 12g contains silver serving as a catalyst for promoting decomposition of oxygen gas into oxygen ions in the cathode 5 and also contributes to a decrease in the electric resistance of the cathode collector 12. The cathode 5 may be formed so as to contain silver. However, the silver-paste-coated wiring 12g having predetermined properties in the cathode collector 12 allows passing of oxygen molecules therethrough and contact of silver particles with the cathode 5. Thus, catalysis similar to that provided by silver particles contained in the cathode 5 is exhibited. In addition, this is less expensive than the case where the cathode 5 is formed so as to contain silver particles.

Figure 2:
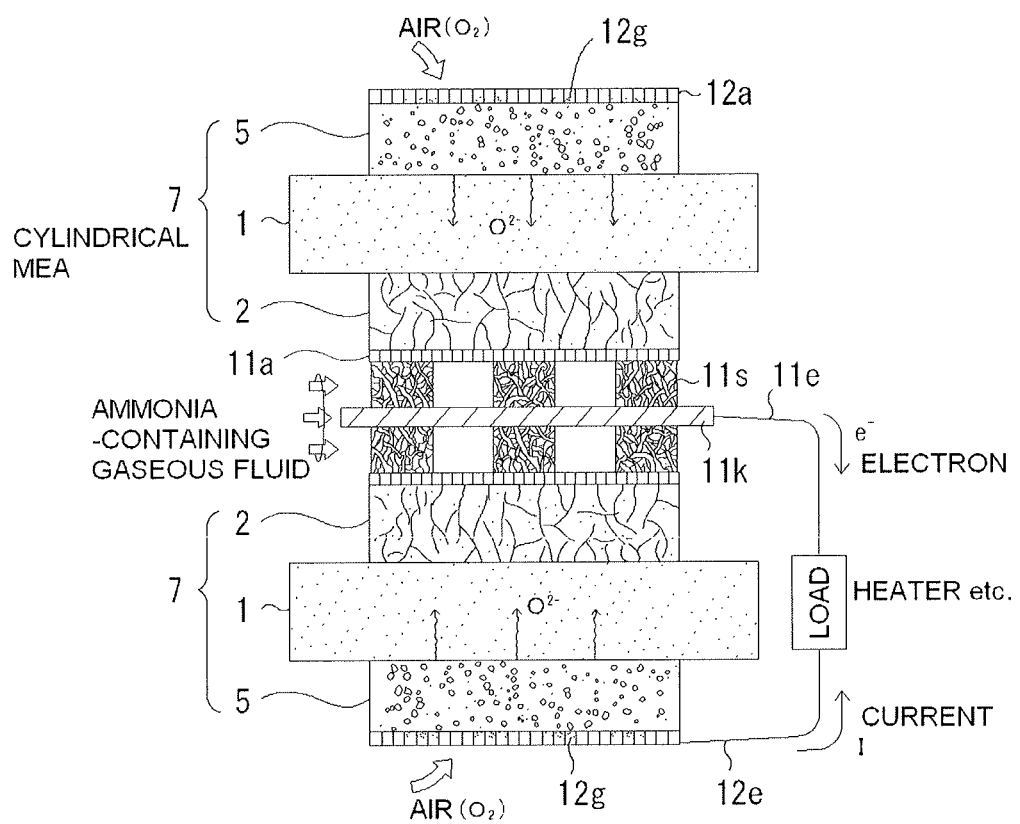
FIG. 2 illustrates the electric wiring system of the gas decomposition component in FIGS. 1A and 1B.

FIG. 2 illustrates the electric wiring system of the gas decomposition component 10 in FIG. 1 when the solid electrolyte is oxygen-ion conductive. An ammonia-containing gaseous fluid is introduced, in a highly airtight manner, into the inner cylinder of the cylindrical MEA 7, that is, the space where the anode collector 11 is disposed. When the cylindrical MEA 7 is used, to pass the gaseous fluid on the inner-surface side of the cylindrical MEA 7, use of the porous metal body 11s is indispensable. In view of decreasing the pressure loss, as described above, use of a metal-plated body, such as Celmet, is important.

While the ammonia-containing gaseous fluid passes through pores in the Ni mesh sheet 11a and the porous metal 11s, it also comes into contact with the anode 2, resulting in an ammonia decomposition reaction described below. Oxygen ions $O^{2-}$ are generated by an oxygen gas decomposition reaction in the cathode and pass through the solid electrolyte 1 to reach the anode 2. That is, this is an electrochemical reaction in the case where oxygen ions, which are anions, move through the solid electrolyte.

(Anode reaction): $2NH_3 + 3O^{2-} \rightarrow N_2 + 3H_2O + 6e^-$ 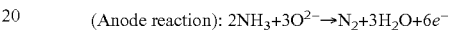

Specifically, a portion of ammonia reacts: $2NH_3 \rightarrow N_2 + 3H_2$. These $3H_2$ react with the oxygen ions $3O^{2-}$ to generate $3H_2O$.

The air, in particular, oxygen gas is passed through a space S and introduced into the cathode 5. Oxygen ions dissociated from oxygen molecules in the cathode 5 are sent to the solid electrolyte 1 toward the anode 2. The cathode reaction is as follows.

(Cathode reaction): $O_2 + 4e^- \rightarrow 2O^{2-}$ 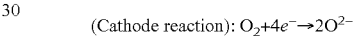

As a result of the electrochemical reaction, electric power is generated; a potential difference is generated between the anode 2 and the cathode 5; current I flows from the cathode collector 12 to the anode collector 11. When a load, such as a heater 41 for heating the gas decomposition component 10, is connected between the cathode collector 12 and the anode collector 11, electric power for the heater 41 can be supplied. This supply of electric power to the heater 41 may be a partial supply. Rather, in most cases, the amount of supply from the self power generation is equal to or lower than half of the overall electric power required for the heater.

As has already been described, the key point of the gas decomposition component above is that, in the anode 2 disposed on the inner-surface side of the cylindrical MEA, while the electric resistance of the anode collector 11 is made low, the pressure loss in the gaseous fluid passing through the anode collector 11 is made low. On the cathode side, although the air does not pass through the cylinder, the key point is that the density of contact points between the air and the cathode is made high and the resistance of the cathode collector 12 is also made low.

The above-described electrochemical reaction is one in which oxygen ions, which are anions, move through the solid electrolyte 1. In another desirable embodiment according to the present invention, for example, the solid electrolyte 1 is composed of barium zirconate ($BaZrO_3$) and a reaction is caused in which protons are generated in the anode 2 and moved through the solid electrolyte 1 to the cathode 5.

When a proton-conductive solid electrolyte 1 is used, for example, in the case of decomposing ammonia, ammonia is decomposed in the anode 2 to generate protons, nitrogen molecules, and electrons; the protons are moved through the solid electrolyte 1 to the cathode 5; and, in the cathode 5, the protons react with oxygen to generate water ($H_2O$). Since protons are smaller than oxygen ions, they move through the solid electrolyte at a higher speed than oxygen ions. Accordingly, while the heating temperature can be decreased, the decomposition capacity on the practical level can be achieved.

In addition, the solid electrolyte 1 can be easily formed so as to have a thickness providing a sufficient strength.

For example, when ammonia is decomposed with a cylindrical-body MEA, an anode is disposed inside the cylindrical-body MEA, and an oxygen-ion-conductive solid electrolyte is used, a reaction generating water occurs inside the cylindrical body (in the anode). The water takes the form of water droplets at low-temperature portions near the outlet of the cylindrical-body MEA and may cause pressure loss. In contrast, when a proton-conductive solid electrolyte is used, protons, oxygen molecules, and electrons react in the cathode (outside) to generate water. Since the outside is substantially open, even when water droplets adhere to low-temperature portions near the outlet, pressure loss is less likely to be caused.

Features of other portions of the gas decomposition component 10 according to the present embodiment will be described.

1. Central Conductive Rod 11k:

The present embodiment has a feature that the MEA 7 is cylindrical and the anode collector 11 includes the central conductive rod 11k. The central conductive rod 11k is preferably formed of a metal such that at least the surface layer does not contain Cr. For example, a Ni conductive rod 11k is preferably used. This is because, when stainless steel containing Cr is employed, during the use, Cr poisoning inhibits the function of ceramic in the anode 2, such as gadolia-doped ceria (GDC). Although the diameter of the central conductive rod 11k is not particularly limited, it is preferably about ⅑ to about ⅓ of the inner diameter of the cylindrical solid electrolyte 1. For example, when the inner diameter is 18 mm, the diameter is preferably about 2 to about 6 mm. When the diameter is excessively large, the maximum gas flow rate becomes low. When the diameter is excessively small, the electric resistance becomes high, leading to a decrease in the voltage at the time of electric power generation. The porous metal body 11s having the shape of a sheet (Celmet sheet) is spirally tightly wound around the central conductive rod 11k to keep the spiral state of the porous metal body 11s. Alternatively, a start-of-winding portion of the sheet is welded to the central conductive rod 11k by resistance welding and then the sheet is spirally tightly wound to keep the spiral state. Accordingly, the electric resistance at the interface between the porous metal body 11s and the central conductive rod 11k is low. The advantages provided by use of the central conductive rod 11k are as follows.

(1) The overall electric resistance from the anode 2 to the external wiring can be decreased. That is, a decrease in the electric resistance of the anode collector 11 is achieved.

(2) The drawback of using the existing cylindrical MEA is that the external terminal of a collector on the inner-surface side cannot be converged to a simple and small structure. For current collection on the inner-surface side of the cylindrical MEA, a porous metal body is indispensable; an end portion of the porous metal body is less likely to be converged and a terminal portion having a small size cannot be formed. For example, when an end of the porous metal is extended to achieve electrical connection with the outside, the size of the gas decomposition component itself becomes large and the commercial value of the component is considerably degraded.

In addition, in view of pressure loss, the extension of the porous metal body is not preferable.

Furthermore, since an ammonia-containing gaseous fluid is introduced into the inside of the cylindrical MEA 7, it is important to establish, in a highly airtight manner, connection between the gaseous-fluid transfer passage and the cylindrical MEA 7 and connection between the anode collector 11 and the external wiring. At an end of the cylindrical MEA 7, both of a connection portion of the anode collector to the external wiring and a connection portion to the gaseous-fluid transfer passage are provided.

The central conductive rod 11k can be easily processed by threading, grooving, or the like. Since the central conductive rod 11k is a solid rod, it does not deform by an external stress to a degree and can stably maintain its shape. As a result, the connection portion between the anode collector 11 and the external wiring can be formed so as to have a simple and small structure.

(3) To efficiently operate the gas decomposition component 10, it needs to be heated to 300° C. to 1000° C., preferably 600° C. to 1000° C. The position where the heater 41 for the heating can be disposed is outside the air passage. The heat propagates from the outside to the inside of the cylindrical MEA 7 and end portions of the cylindrical MEA 7 naturally have a high temperature. To connect the external wiring and the gaseous-fluid transfer passage to such a high-temperature end portion in a highly airtight manner, in view of the above-described high temperature, a special heat-resistant resin is required. In addition, for example, corrosion caused by gas tends to proceed as the temperature increases. Accordingly, in view of corrosion resistance, a special material may be required. As a result, usable resins may be limited to very expensive resins.

In contrast, when the central conductive rod 11k is used, it is disposed at a position farthest from the heater-41-side outside and can be easily extended in the axial direction. Accordingly, at an extension position at a relatively low temperature, the electrical connection to the external wiring and the connection to the gaseous-fluid transfer passage can be achieved in a highly airtight manner. As a result, the necessity of using special resins has been eliminated and a resin having heat resistance and corrosion resistance on the ordinary level can be used. Thus, the cost efficiency can be increased and the durability can be enhanced.

Figure 3:
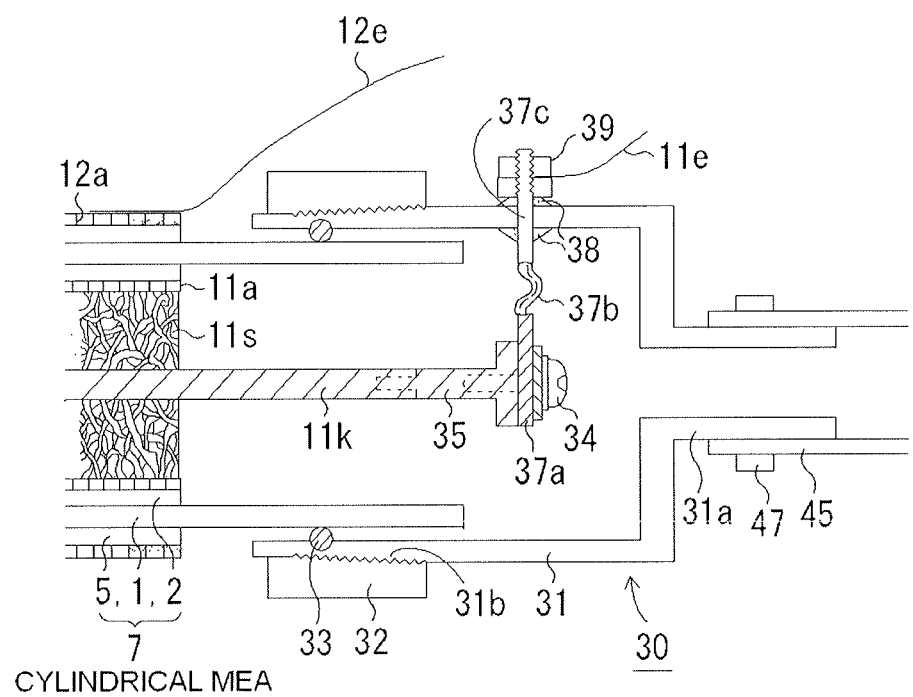
FIG. 3 illustrates a state in which an external wire and a gaseous-fluid transfer passage are connected to a cylindrical MEA.

FIG. 3 illustrates a connection state between the central conductive rod 11k and an external wire 11e and a connection state between the cylindrical MEA 7 and a gaseous-fluid transfer passage 45. A tubular joint 30 formed of a fluorocarbon resin is engaged with the end of the cylindrical MEA 7. The engagement is performed such that the following state is maintained: an O-ring 33 contained on the inner-surface side of an engagement portion 31b extending from a body portion 31 of the tubular joint 30 to the solid electrolyte 1 butts against the outer surface of the solid electrolyte 1 composed of a ceramic, which is a sinter. Accordingly, the engagement portion 31b of the tubular joint 30 is formed so as to have an outer diameter that changes in a tapered manner. The tapered portion is threaded and, to this thread, a circular nut 32 is screwed. By screwing the circular nut in the direction in which the outer diameter increases, the engagement portion 31b is tightened in its outer surface. Thus, the airtightness provided with the O-ring 33 can be adjusted.

In the body portion 31 of the tubular joint 30, a conductive penetration part 37c that penetrates the body portion 31 in an airtight manner is provided. To ensure the airtightness, for example, a sealing resin 38 is applied. The conductive penetration part 37c is preferably a cylindrical rod threaded for screwing a nut 39 for the purpose of ensuring electrical connection with the external wire 11e. To the intra-tube end of the conductive penetration part 37c, a conductive lead 37b is connected. Another end of the conductive lead 37b is connected to a connection plate 37a.

Electrical connection between the connection plate 37a and a tip portion 35 of the central conductive rod 11k is established by using a connection tool such as a screwdriver and tightening a screw 34 with the screwdriver inserted into a protrusion hole portion 31a of the tubular joint 30. By tightening the screw 34 with the screwdriver, the electric resistance (contact resistance) in the electrical connection between the tip portion 35 and the connection plate 37a can be substantially eliminated.

By winding an external wire 12e around the outer circumference of an end portion of the Ni mesh sheet 12a of the cathode collector 12, connection to the outside can be established. Since the cathode 5 is positioned on the outer-surface side of the cylindrical MEA 7, the establishment of the connection is less difficult than that from the anode collector 11 to the outside.

The gaseous-fluid transfer passage 45 is preferably an elastically deformable tube composed of, for example, a resin. The tube 45 is engaged around the outer circumference of the protrusion hole portion 31a and fastened with a fastener 47. As a result, a connection that is highly airtight can be obtained.

In FIG. 3, both of the connection between the anode collector 11 and the external wire 11e and the connection between the tubular joint 30 and the gaseous-fluid transfer passage 45 are achieved by very simple and small structures. In addition, these two connections are disposed at positions that are separated from the main stream of thermal flow from the heater, by using the central conductive rod 11k and the tip portion 35 attached thereto. Accordingly, use of a fluorocarbon resin, which is an ordinary heat- or corrosion-resistant resin, can ensure durability for repeated use for a long period of time. For confirmation, it is noted that the central conductive rod 11k is electrically connected to the porous metal body 11s with a low contact resistance as described above.

2. Ni Mesh Sheet 11a of Anode Collector:

The Ni mesh sheet 11a in the anode collector 11 in FIGS. 1A and 1B is an important component that decreases the electric resistance of the anode collector 11, which contributes to a decrease in the pressure loss of the gas flow. As described above, the anode collector 11 has an electric conduction path of anode 2/Ni mesh sheet 11a/porous metal body (Celmet) 11s/central conductive rod 11k. When the Ni mesh sheet 11a is not used, the porous metal body 11s is in direct contact with the anode 2. In this case, even when the porous metal body 11s is constituted by a metal-plated body such as Celmet, the contact resistance becomes high as described below. The metal-plated body has the shape of a sheet having a predetermined thickness; microscopically, dendritic metal forms a network structure.

When a metal-plated body is inserted as a first-electrode collector on the inner-surface side of the cylindrical-body MEA, the above-described sheet-shaped metal-plated body is spirally wound and the metal-plated body is inserted such that the axial center of the spiral extends along the axial center of the cylindrical-body MEA. In the outer circumferential surface of the spiral sheet, the outermost edge or the generatrix portions at predetermined positions in the spiral tend to be in contact with the inner surface of the cylinder; however, portions positioned inside relative to the above-described portions tend to be separated from the first electrode because of the shape of not a non-concentric circle but a spiral. When the sheet can be strongly tightly wound around the central conductive rod 11k, the contact resistance can be decreased; however, the outer-circumferential side of the spiral is not in the same state as that of the center of the spiral. Accordingly, a sufficiently large contact area is less likely to be achieved between the porous metal body and the first electrode. Likewise, regarding contact pressure, a sufficiently high contact pressure can be ensured in the predetermined generatrix portions, whereas the contact pressure of portions positioned inside relative to the above-described portions becomes insufficient. Accordingly, when electrical connection is established by direct contact between the porous metal body and the first electrode, the contact resistance becomes high, resulting in an increase in the electric resistance of the first-electrode collector. An increase in the electric resistance of the collector results in degradation of the electrochemical-reaction performance. To make matters worse, in order to increase the contact area, the porous metal body 11s is conventionally arranged continuously over the entire length of the anode 2. This arrangement of the porous metal body 11s continuously over the entire length results in an increase in the pressure loss of the introduced gaseous fluid.

In contrast, by using the metal mesh sheet 11a, in particular, a Ni mesh sheet, the contact resistance can be decreased in the following manner. Specifically, since the Ni mesh sheet 11a has the shape of a single sheet, the entire circumference of the Ni mesh sheet 11a naturally comes in contact with the cylindrical inner surface of the first electrode.

As a result of, for example, application of an external force (compressive) for filling the cylindrical body and adjustment of increasing the amount of materials for the filling, the metal mesh sheet 11a and the metal-plated body 11s conform to each other and protrude to the anode 2, resulting in an increase in the contact area with the anode 2. At the contact interface between the metal mesh sheet 11a and the metal-plated body 11s, the metal dendritic structures are pressed against each other and enter each other's pores to thereby achieve contact with each other. Accordingly, a low contact resistance is maintained.

As described above, even when a metal-plated body Celmet (registered trademark) is used as the porous metal body 11s, the absence of a Ni mesh sheet results in a relatively high contact resistance: the electric resistance between the cathode collector 12 and the anode collector 11 of the gas decomposition component 10 is, for example, about 4 to about 7Ω. By inserting the Ni mesh sheet 11a into this structure, the electric resistance can be decreased to about 1Ω or less, that is, decreased by a factor of about 4 or more.

From the above-described configuration in which the Ni mesh sheet 11a is used in the anode collector 11, the following findings have been revealed.

(F1) By disposing the Ni mesh sheet 11a, it will suffice that the porous metal body 11s is discontinuously disposed inside the cylindrical MEA. Thus, in the configuration illustrated in FIG. 1A, a sufficiently low electric resistance can be achieved. Accordingly, the conventional necessity of continuously arranging the porous metal body 11s over the entire length of the cylindrical MEA 7 is eliminated.

(F2) As a result of discontinuously arranging the porous metal body 11s at intervals, pressure loss in the flow of the ammonia-containing gaseous fluid can be considerably decreased. As a result, for example, a sufficiently large amount of an ammonia-containing gaseous fluid discharged from a waste-gas unit of semiconductor fabrication equipment can be extracted without application of a large pressure difference and the electric-power cost required for extracting the gaseous fluid can be reduced.

In addition, the requirements for parts of the piping system and the gas decomposition component in view of the pressure difference can be relaxed. Thus, the cost efficiency can be enhanced and the risk of accidents due to large pressure difference or the like can also be reduced.

Figure 4A:
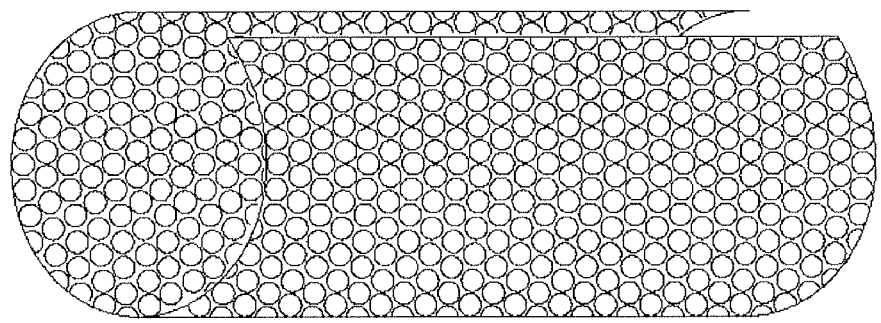
FIG. 4A illustrates a Ni mesh sheet in a gas decomposition component, the sheet having a structure formed by perforating a Ni sheet.
Figure 4B:
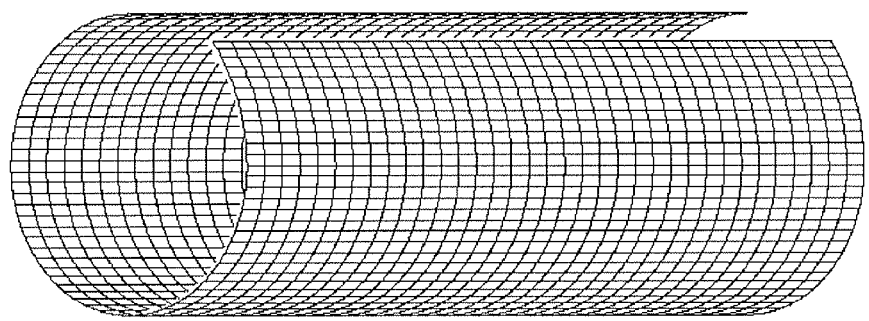
FIG. 4B illustrates a Ni mesh sheet in a gas decomposition component, the sheet having a structure formed by knitting Ni wires.

FIGS. 4A and 4B illustrate the Ni mesh sheets 11a. As for FIG. 4A, a single-phase Ni sheet is perforated to form the mesh structure. As for FIG. 4B, Ni wires are knitted to form the mesh structure. Both of these sheets may be used as the Ni mesh sheets 11a. In FIG. 4, although the Ni mesh sheets 11a do not have the shape of a cylinder, in the actual gas decomposition component 10, such a sheet having the shape of an incomplete cylinder whose top portion is somewhat open may be used.

3. Silver-Paste-Coated Wiring 12g:

Conventionally, in general, silver particles are disposed in the cathode 5 so that catalysis by the silver particles is used to increase the decomposition rate of oxygen molecules. However, in the structure including the cathode 5 containing silver particles, the cost of the cathode 5 becomes high, resulting in a decrease in cost efficiency. Instead of forming the cathode 5 so as to contain silver particles, silver-particle wiring can be formed in the form of a silver-paste-coated layer on the outer surface of the cathode 5.

Figure 5:
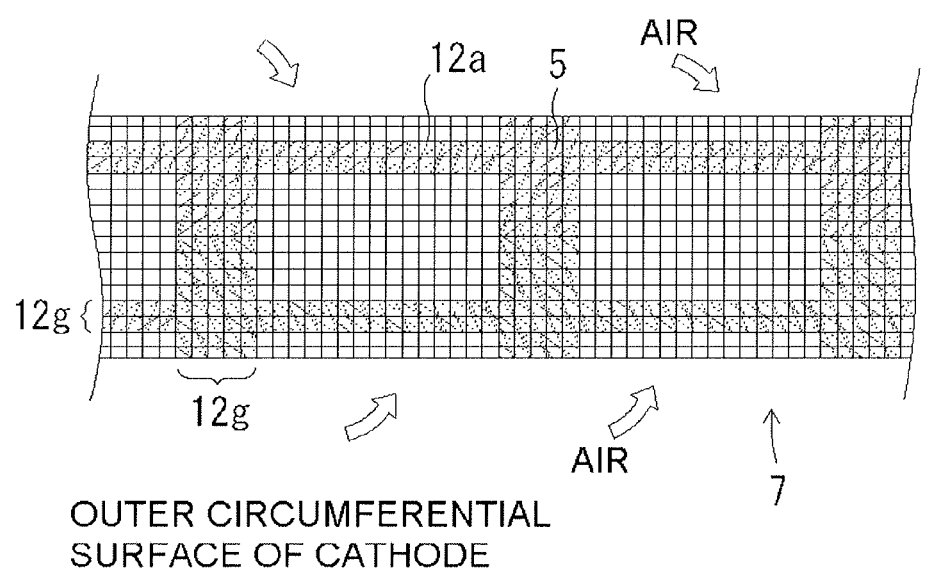
FIG. 5 illustrates silver-paste-coated wiring and a Ni mesh sheet that are disposed on the outer circumferential surface of the cylindrical cathode.

FIG. 5 illustrates the silver-paste-coated wiring 12g and the Ni mesh sheet 12a that are disposed on the outer circumferential surface of the cylindrical cathode 5. The silver-paste-coated wiring 12g may be formed by, for example, applying silver paste onto the outer circumferential surface of the cathode 5 such that band-shaped wires are disposed in a grid pattern (in the generatrix direction and in the circular direction) as illustrated in FIG. 5.

Figure 6A:
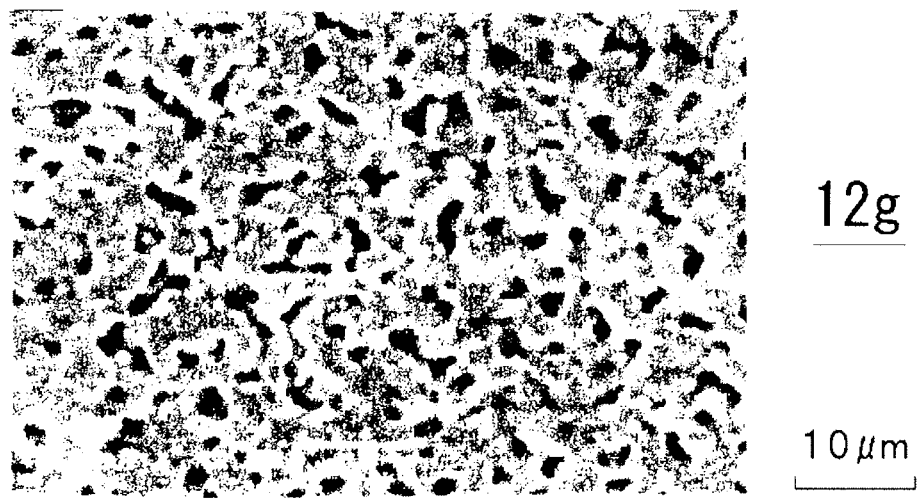
FIG. 6A is an image data, a scanning electron microscopic image illustrating the surface state of silver-paste-coated wiring.
Figure 6B:
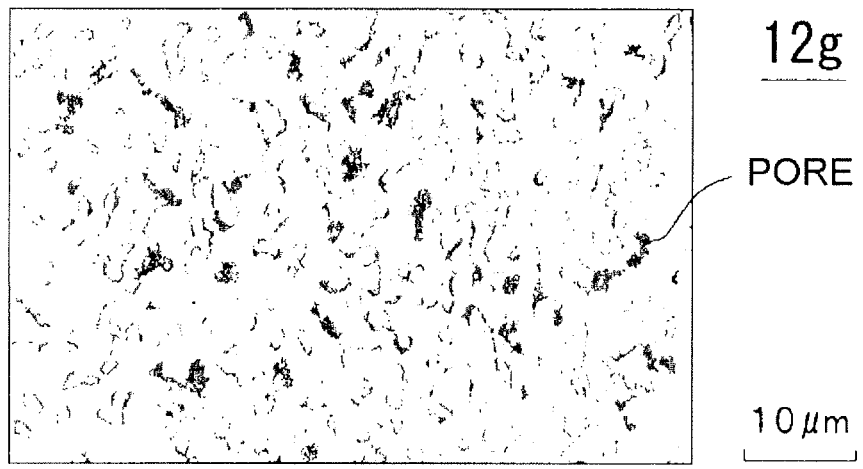
FIG. 6B is an explanatory view for FIG. 6A.

In the silver paste, it is important that the silver paste is dried or sintered so as to provide a porous structure having a high porosity. FIG. 6 are scanning electron microscopy (SEM) images illustrating the surface of the silver-paste-coated wiring 12g: FIG. 6A is an image data and FIG. 6B is an explanatory view of the image data. In FIG. 6B, black areas represent pores and the pores are in communication with one another. Silver pastes that provide a porous structure as illustrated in FIG. 6 by being applied and dried (sintered) are commercially available. For example, DD-1240 manufactured by Kyoto Elex Co., Ltd. may be used. The importance that the silver-paste-coated wiring 12g is formed so as to be porous is based on the following reason.

The amount of oxygen molecules $O_2$ supplied to the cathode 5 is preferably maximized. In addition, silver particles contained in silver paste have catalysis that promotes the cathode reaction in the cathode 5 (refer to FIG. 8). By applying the silver-paste-coated wiring 12g on the cathode 5, points (contact points) where a metal oxide that allows oxygen ions in the cathode to pass therethrough, such as lanthanum strontium manganite (LSM), silver particles, and oxygen molecules $O_2$ come into contact with each other are formed at a high density. By forming the silver-paste-coated wiring 12g so as to be porous, a large number of oxygen molecules $O_2$ enter pores of the porous structure to come into contact with the contact points, increasing the probability of the occurrence of the cathode reaction.

In addition, since the silver-paste-coated wiring 12g containing silver particles have a high conductivity, together with the Ni mesh sheet 12a, it decreases the electric resistance of the cathode collector 12. Accordingly, as described above, the silver-paste-coated wiring 12g is preferably continuously disposed in a grid pattern (in the generatrix direction and in the circular direction). The Ni mesh sheet 12a on the outer side is wound so as to be in contact with and electrically connected to the silver-paste-coated wiring 12g.

In summary, by using the silver-paste-coated wiring 12g that is porous, (1) the cathode reaction can be promoted and (2) the electric resistance of the cathode collector 12 can be decreased.

The silver-paste-coated wiring 12g may be formed so as to have the shape of bands in a grid pattern as illustrated in FIG. 5 or may be formed over the entire outer circumferential surface of the cathode 5. When the silver paste is applied over the entire outer circumferential surface of the cathode 5, the term "wiring" may be awkward. However, in the present description, the term "silver-paste-coated wiring" is also used in the cases where the silver paste is applied over the entire regions of the outer circumferential surface without leaving blank regions. In such cases where the silver paste is applied over the entire outer circumferential surface of the cathode 5, the Ni mesh sheet 12a may be omitted.

Hereinafter, the configuration of components will be described.

4. Anode 2

—Configuration and Effect—

Figure 7:
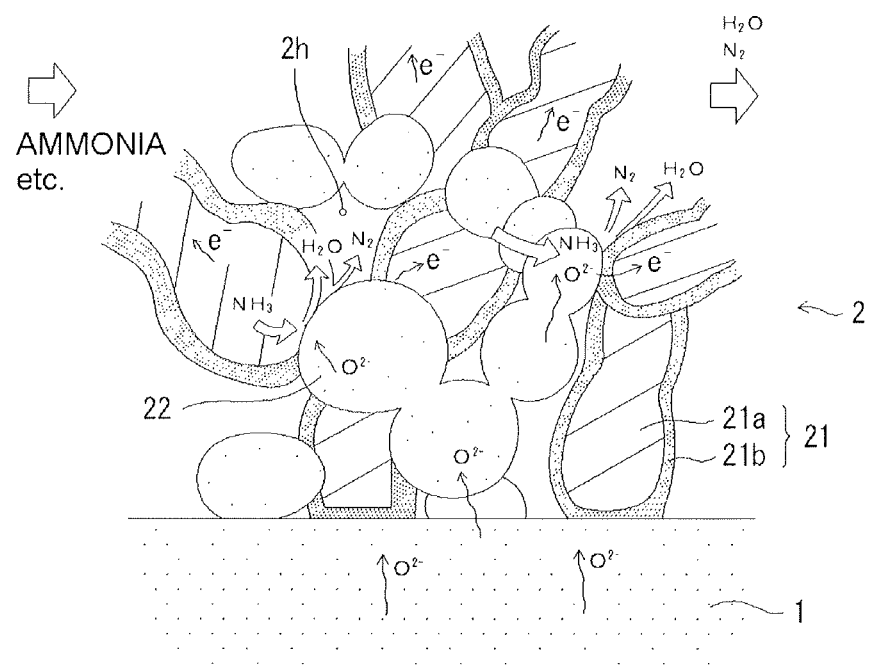
FIG. 7 is an explanatory view of an electrochemical reaction in an anode.

FIG. 7 is an explanatory view of the electrochemical reaction in the anode 2 in the case where the solid electrolyte 1 is oxygen-ion conductive. An ammonia-containing gaseous fluid is introduced into the anode 2 and flows through pores 2h. The anode 2 is a sinter mainly composed of metal chain particles 21 whose surfaces are oxidized to have oxide layers and an oxygen-ion conductive ceramic 22. Examples of the oxygen-ion conductive ceramic 22 include scandium stabilized zirconia (SSZ), yttrium stabilized zirconia (YSZ), samarium doped-ceria (SDC), lanthanum gallate (LSGM), and GDC (gadolinia doped-ceria).

The metal of the metal chain particles 21 is preferably nickel (Ni) or iron (Fe)-containing Ni. More preferably, the metal contains Ti in a trace amount, about 2 to about 10000 ppm. (1) Ni itself has catalysis that promotes decomposition of ammonia. When Ni contains a trace amount of Fe or Ti, the catalysis can be further enhanced. When such Ni is oxidized to form nickel oxide, the catalysis due to the elemental metals can be further enhanced. Note that the decomposition reaction of ammonia (anode reaction) is a reduction reaction; in the product to be used, Ni chain particles have oxide layers formed by sintering or the like; as a result of use of the product, the metal chain particles in the anode are also reduced and the oxide layers are eliminated. However, Ni itself certainly has catalysis. In addition, to compensate for the lack of the oxide layers, Ni may contain Fe or Ti to compensate for the degradation of the catalysis.

In addition to the catalysis, in the anode, oxygen ions are used in the decomposition reaction. Specifically, the decomposition is performed in the electrochemical reaction. In the anode reaction $2NH_3+3O^{2-} \rightarrow N_2+3H_2O+6e^-$, oxygen ions contribute to a considerable increase in the decomposition rate of ammonia. (3) In the anode reaction, free electrons $e^-$ are generated. When electrons $e^-$ remain in the anode 2, the occurrence of the anode reaction is inhibited. The metal chain particles 21 have the shape of an elongated string; a content 21a covered with an oxide layer 21b is composed of a metal (Ni) serving as a good conductor. Electrons $e^-$ smoothly flow in the longitudinal direction of the string-shaped metal chain particles. Accordingly, electrons $e^-$ do not remain in the anode 2 and pass through the contents 21a of the metal chain particles 21 to the outside. The metal chain particles 21 considerably facilitate passage of electrons $e^-$. In summary, features in an embodiment of the present invention are the following (e1), (e2), and (e3) in the anode.

(e1) promotion of decomposition reaction by nickel chain particles, Fe-containing nickel chains, or Fe- and Ti-containing nickel chain particles (high catalysis)
(e2) promotion of decomposition by oxygen ions (promotion of decomposition in electrochemical reaction)
(e3) establishment of conduction of electrons with string-shaped good conductor of metal chain particles (high electron conductivity)

These (e1), (e2), and (e3) considerably promote the anode reaction.

By simply increasing the temperature and contacting with a catalyst a gas to be decomposed, decomposition of this gas proceeds. This is disclosed in literatures and well known as described above. However, as described above, in a component constituting a fuel cell, oxygen ions supplied from the cathode 5 and through the ion-conductive solid electrolyte 1 are used in the reaction and the resultant electrons are conducted to the outside; thus, the rate of the decomposition reaction is considerably increased. A big feature of the present invention is the functions (e1), (e2), and (e3) above and a configuration providing these functions.

In the above description, the case where the solid electrolyte 1 is oxygen-ion conductive is described. Alternatively, the solid electrolyte 1 may be proton ($H^+$)-conductive. In this case, the ion-conductive ceramic 22 in the anode 2 may be a proton-conductive ceramic, for example, barium zirconate.

—Mixing and Sintering—

When the oxygen-ion-conductive metal oxide (ceramic) in the anode 2 is SSZ, a SSZ raw-material powder has an average particle size of about 0.5 μm to about 50 μm. The mixing ratio (mol ratio) of the metal chain particles 21 whose surfaces are oxidized to SSZ 22 is in the range of 0.1 to 10. The mixture is sintered by, for example, being held in the air atmosphere at a temperature in the range of 1000° C. to 1600° C. for 30 to 180 minutes. The production method will be described below, in particular, in conjunction with the production method of the cylindrical MEA 7.

5. Metal Chain Particles 21:

—Reduction Precipitation Process—

The metal chain particles 21 are preferably produced by a reduction precipitation process. This reduction precipitation process for the metal chain particles 21 is described in detail in, for example, Japanese Unexamined Patent Application Publication No. 2004-332047. The reduction precipitation process described herein employs trivalent titanium (Ti) ions as a reducing agent and precipitated metal particles (such as Ni particles) contain a trace amount of Ti. Accordingly, quantitative analysis in terms of Ti content allows identification that the particles are produced by a reduction precipitation process employing trivalent titanium ions. By changing the type of metal ions coexistent with the trivalent titanium ions, desired metal particles can be obtained; to obtain Ni particles, Ni ions are used together with the trivalent titanium ions; addition of a trace amount of Fe ions results in the formation of Ni chain particles containing a trace amount of Fe.

To form chain particles, the metal needs to be a ferromagnetic metal and also satisfy a predetermined size or more. Since Ni and Fe are ferromagnetic metals, metal chain particles can be easily formed. The requirement in terms of size needs to be satisfied during the process in which a ferromagnetic metal forms magnetic domains to cause bonding together through magnetic force and, in this bonding state, metal precipitation and subsequent growth of a metal layer are achieved to cause integration as a metal body. After metal particles having a predetermined size or more are bonded together through magnetic force, the metal precipitation continues: for example, neck portions at the boundaries between bonded metal particles grow thicker together with the other portions of the metal particles.

The metal chain particles 21 contained in the anode 2 preferably have an average diameter D of 5 nm or more and 500 nm or less, and an average length L of 0.5 μm or more and 1000 μm or less. The ratio of the average length L to the average diameter D is preferably 3 or more. Note that the metal chain particles 21 may have dimensions that do not satisfy these ranges.

—Formation of Oxide Layer—

The importance of the surface oxidation treatment slightly diminishes for the anode 2 because reduction is to be caused.

Hereinafter, such surface oxidation processes will be described. Three processes are preferred: (i) thermal oxidation by vapor-phase process, (ii) electrolytic oxidation, and (iii) chemical oxidation. In (i), a treatment is preferably performed in the air at 500° C. to 700° C. for 1 to 30 minutes; this is the simplest process; however, control of the thickness of the oxide film is less likely to be achieved. In (ii), the surface oxidation is achieved by anodic oxidation through application of an electric potential of about 3 V with respect to a standard hydrogen electrode; this process has a feature that the thickness of the oxide film can be controlled by changing the amount of electricity in accordance with a surface area; however, for a large area, a uniform oxide film is less likely to be formed. In (iii), the surface oxidation is achieved by immersion for about 1 to about 5 minutes in a solution in which an oxidizing agent such as nitric acid is dissolved; the thickness of the oxide film can be controlled by changing time, temperature, or the type of the oxidizing agent; however, washing the agent off is cumbersome. Although all these processes are preferred, (i) and (iii) are more preferred.

The oxide layer desirably has a thickness in the range of 1 nm to 100 nm, more preferably 10 nm to 50 nm. Note that the thickness may be out of such ranges. When the thickness of the oxide film is excessively small, catalysis is not sufficiently provided; in addition, metalization may be caused even in a slightly reducing atmosphere. On the other hand, when the thickness of the oxide film is excessively large, catalysis is sufficiently maintained; however, electron conductivity is degraded at the interface, resulting in degradation of electric power generation performance.

6. Cathode 5:

—Configuration and Effect—

Figure 8:
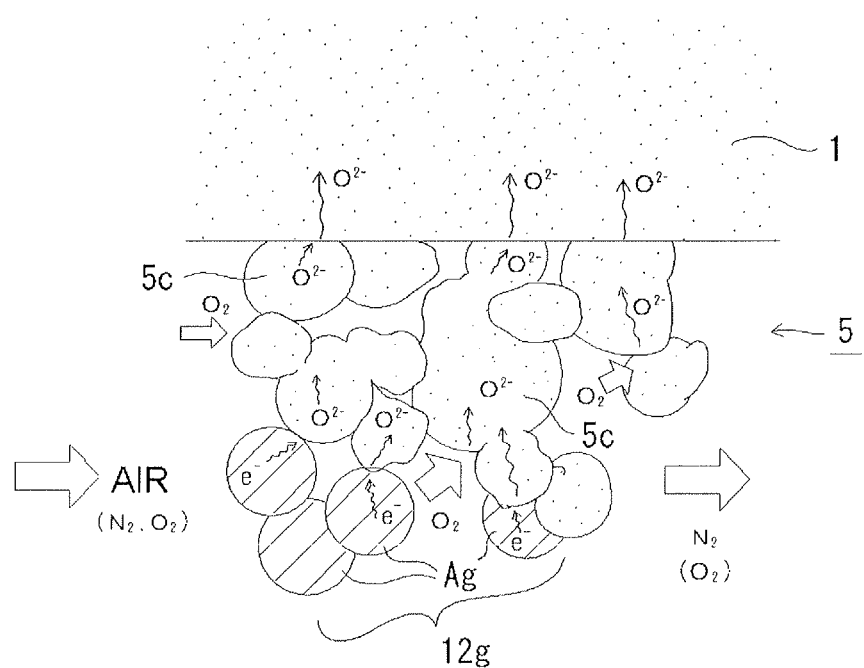
FIG. 8 is an explanatory view of an electrochemical reaction in a cathode.

FIG. 8 is an explanatory view of the electrochemical reaction in the cathode 5 in the case where the solid electrolyte 1 is oxygen-ion conductive. In the cathode 5, the air, in particular, oxygen molecules are introduced.

The cathode 5 is a sinter mainly composed of an oxygen-ion-conductive ceramic 5c. In this case, preferred examples of the oxygen-ion-conductive ceramic 5c include LSM (lanthanum strontium manganite), lanthanum strontium cobaltite (LSC), and samarium strontium cobaltite (SSC).

In the cathode 5 according to the present embodiment, Ag particles are disposed in the form of the silver-paste-coated wiring 12g. In this form, the Ag particles exhibit catalysis that considerably promotes the cathode reaction: $O_2 + 4e^- \rightarrow 2O^{2-}$. As a result, the cathode reaction can proceed at a very high rate. The Ag particles preferably have an average size of 10 nm to 100 nm.

In the above description, the case where the solid electrolyte 1 is oxygen-ion conductive is described. Alternatively, the solid electrolyte 1 may be proton ($H^+$)-conductive. In this case, the ion-conductive ceramic 5c in the cathode 5 may be a proton-conductive ceramic, preferably barium zirconate or the like.

—Sintering—

SSZ having an average size of about 0.5 μm to about 50 μm is preferably used. Sintering conditions are holding in the air atmosphere at a temperature in the range of 1000° C. to 1600° C. for about 30 to about 180 minutes.

7. Solid Electrolyte 1:

Although the electrolyte 1 may be a solid oxide, molten carbonate, phosphoric acid, a solid polymer, or the like, the solid oxide is preferred because it can be used in a small size and easily handled. Preferred examples of the solid oxide 1 include oxygen-ion-conductive oxides such as SSZ, YSZ, SDC, LSGM, and GDC. Alternatively, as described above, proton-conductive barium zirconate may be used.

8. Metal-Plated Body 11s:

The porous metal body 11s, which is an important component of the collector for the anode 2 is preferably a metal-plated body. The porous metal body 11s is preferably a metal-plated porous body, in particular, a Ni-plated porous body, that is, Celmet (registered trademark) described above. The Ni-plated porous body can be formed so as to have a high porosity of, for example, 0.6 or more and 0.98 or less; thus, it can function as a component of the collector for the anode 2 serving as an inner-surface-side electrode and can also have very high gas permeability. When the porosity is less than 0.6, the pressure loss becomes high; when forced circulation employing a pump or the like is performed, the energy efficiency decreases and, for example, bending deformation is caused in ion-conductive members and the like, which is not preferable. To reduce the pressure loss and to suppress damage to ion-conductive members, the porosity is preferably 0.8 or more, more preferably 0.9 or more. On the other hand, when the porosity is more than 0.98, the electric conductivity becomes low and the current-collecting capability is degraded.

9. Method for Producing Cylindrical MEA

Figure 9:
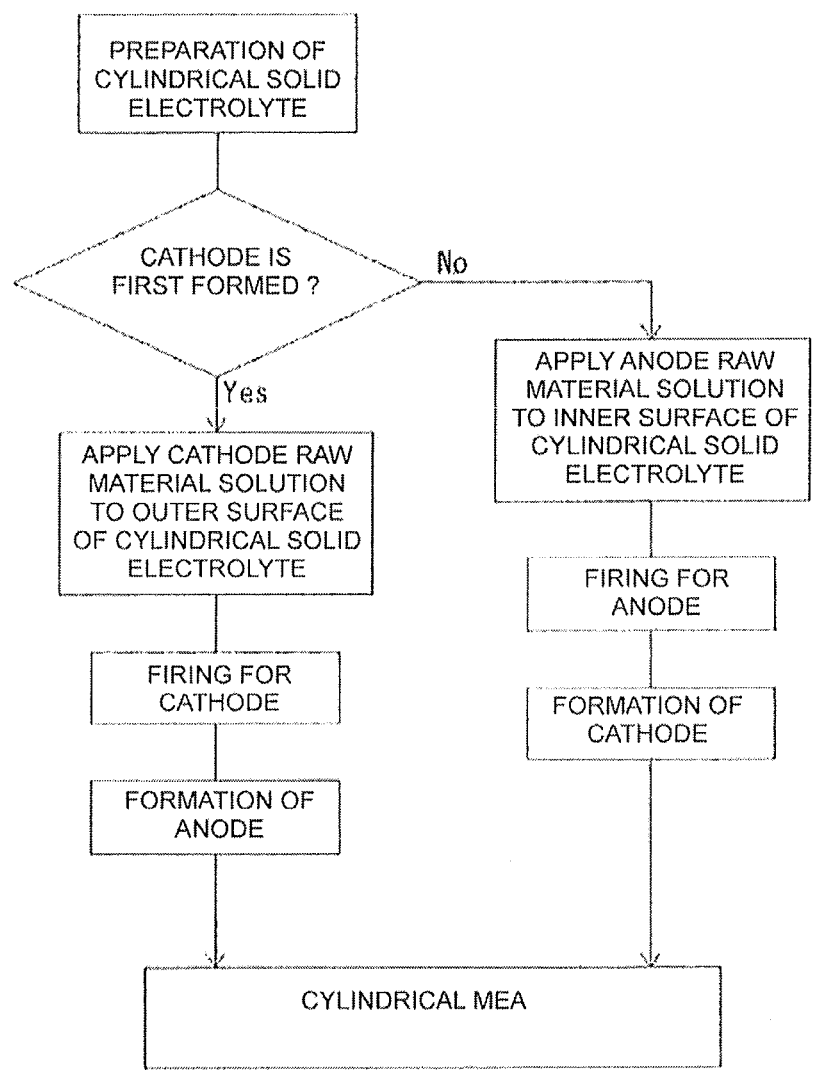
FIG. 9 is an explanatory view of a method for producing a cylindrical MEA.

Referring to FIG. 9, an overview of a method for producing the cylindrical MEA 7 will be described. FIG. 9 illustrates steps in which the anode 2 and the cathode 5 are separately fired. A cylindrical solid electrolyte 1 that is commercially available is first bought and prepared. When the cathode 5 is then formed, a solution is prepared by dissolving a cathode-forming material in a solvent to achieve a predetermined flowability; and the solution is uniformly applied to the outer surface of the cylindrical solid electrolyte. The applied solution is then fired under firing conditions suitable for the cathode 5. Subsequently, formation of the anode 2 is performed. Other than the production methods illustrated in FIG. 9, there are a large number of variations. In a case in which firing is performed only once, the firing is not performed separately for the portions as illustrated in FIG. 9, but the portions are formed in the applied state and finally the portions are fired under conditions suitable for both of the portions. In addition, there are a large number of variations. The production conditions can be determined in comprehensive consideration of, for example, materials forming the portions, a target decomposition efficiency, and production costs.

10. Arrangement of Gas Decomposition Components

Figure 10A:
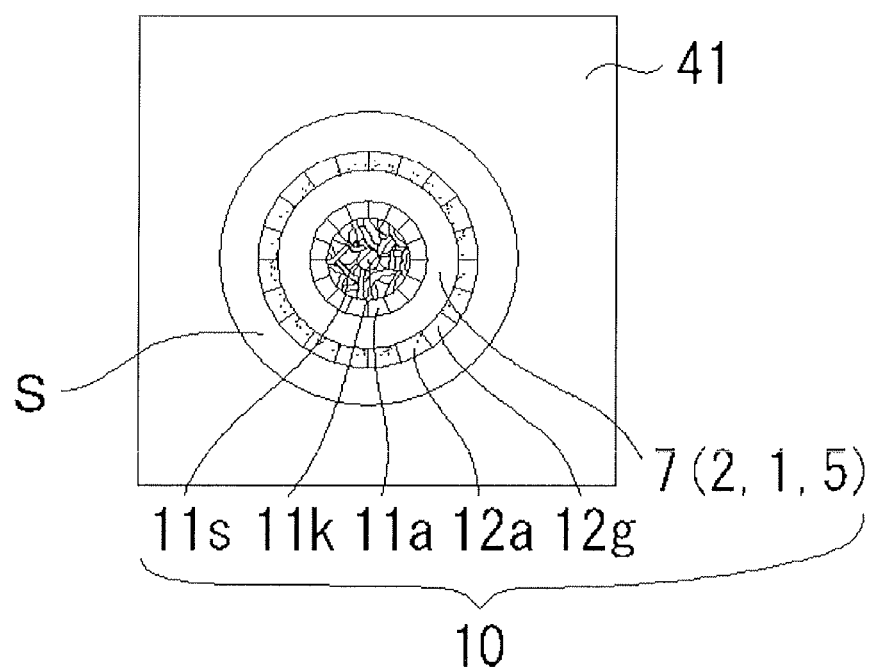
FIG. 10A illustrates a gas-decomposition-component arrangement, a configuration having a single cylindrical MEA.
Figure 10B:
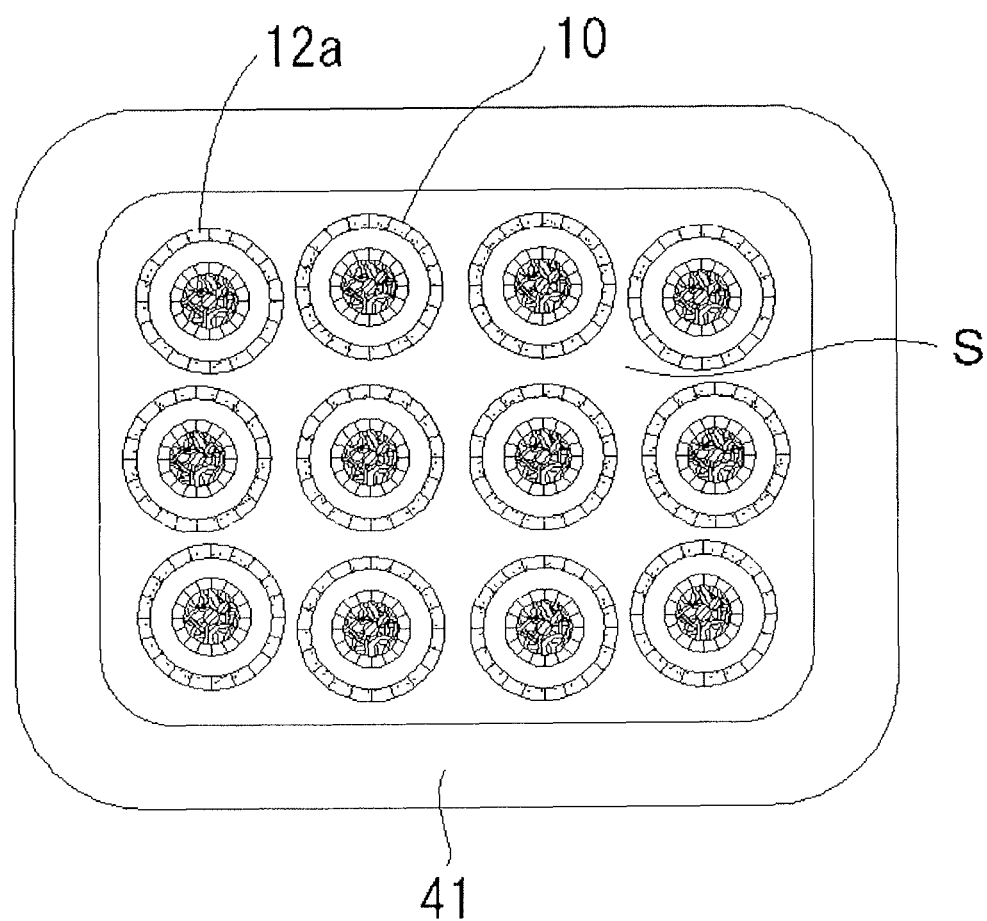
FIG. 10B illustrates a configuration in which a plurality of the structures (12 structures) in FIG. 10A are arranged in parallel.

FIG. 10 illustrate examples of the arrangement of the gas decomposition components 10. FIG. 10A illustrates a gas detoxification apparatus employing a single cylindrical MEA 7. FIG. 10B illustrates a gas detoxification apparatus having a configuration in which a plurality of the structures (12 structures) illustrated in FIG. 10A are arranged in parallel. When the treatment capacity provided by a single MEA 7 is insufficient, parallel arrangement of a plurality of the MEAs 7 allows an increase in the capacity without cumbersome processing. In each of the plurality of cylindrical MEAs 7, the anode collector 11 (11a, 11s, and 11k) is inserted on the inner-surface side and an ammonia-containing gaseous fluid is passed on the inner-surface side. On the outer-surface side of the cylindrical MEA 7, a space S is provided so that high-temperature air or high-temperature oxygen comes into contact with the outer surface.

The heater 41, which is a heating unit, may be disposed so as to bind together all the cylindrical MEAs 7 arranged in parallel. In such a configuration in which all the structures are bound together, size reduction can be achieved.

Second Embodiment

Figure 11A:
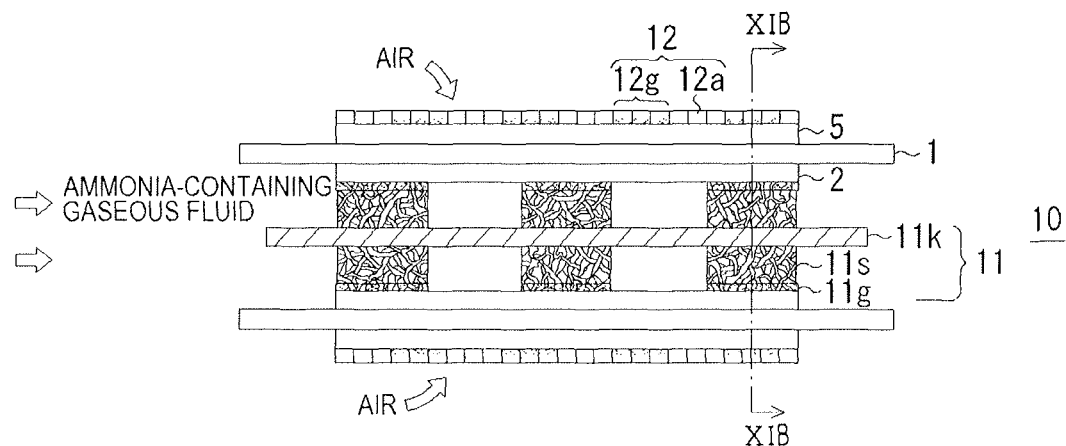
FIG. 11A is a longitudinal sectional view of a gas decomposition component according to a second embodiment of the present invention.
Figure 11B:
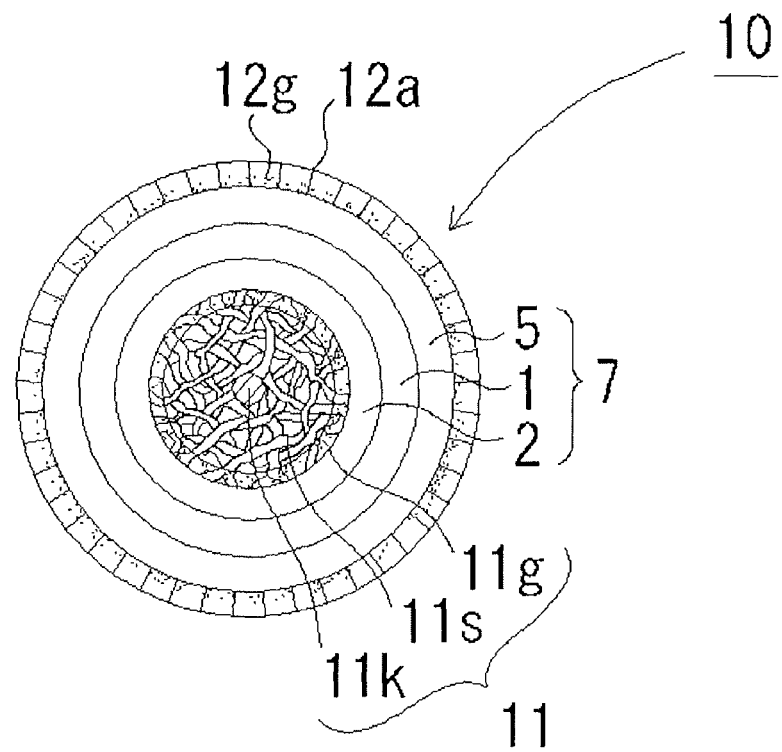
FIG. 11B is a sectional view taken along line XIB-XIB in FIG. 11A.

FIG. 11A is a longitudinal sectional view of a gas decomposition component 10 according to a second embodiment of the present invention. FIG. 11B is a sectional view taken along line XIB-XIB in FIG. 11A. The present embodiment has a feature that an anode collector 11 is constituted by Ni paste layer 11g in contact with anode 2/porous metal body 11s/central conductive rod 11k. Specifically, the feature is that the Ni mesh sheet 11a in the gas decomposition component 10 in FIGS. 1A and 1B is replaced by the Ni paste layer 11g.

As described above, in spite of using a metal-plated body Celmet (registered trademark) as the porous metal body 11s, the contact resistance is relatively high: the electric resistance between a cathode collector 12 and the anode collector 11 of the gas decomposition component 10 is, for example, about 6Ω. In this structure, by additionally forming the Ni paste layer 11g, the electric resistance can be decreased to about 2Ω, that is, decreased by a factor of about 3. This effect of reducing electric resistance is equivalent to that of the Ni mesh sheet 11a.

Selection between the Ni paste layer 11g and the Ni mesh sheet 11a is preferably determined in consideration of, for example, cost efficiency and ease of production.

As for structures, components, and the like that are not particularly specified above (such as, the central conductive rod 11k, the silver-paste-coated wiring 12g, the anode 2, the metal chain particles 21, the cathode 5, the solid electrolyte 1, the metal-plated body 11s, the method for producing the cylindrical MEA 7, and arrangement of gas decomposition components), those described in the first embodiment can be employed.

Third Embodiment

Figure 12A:
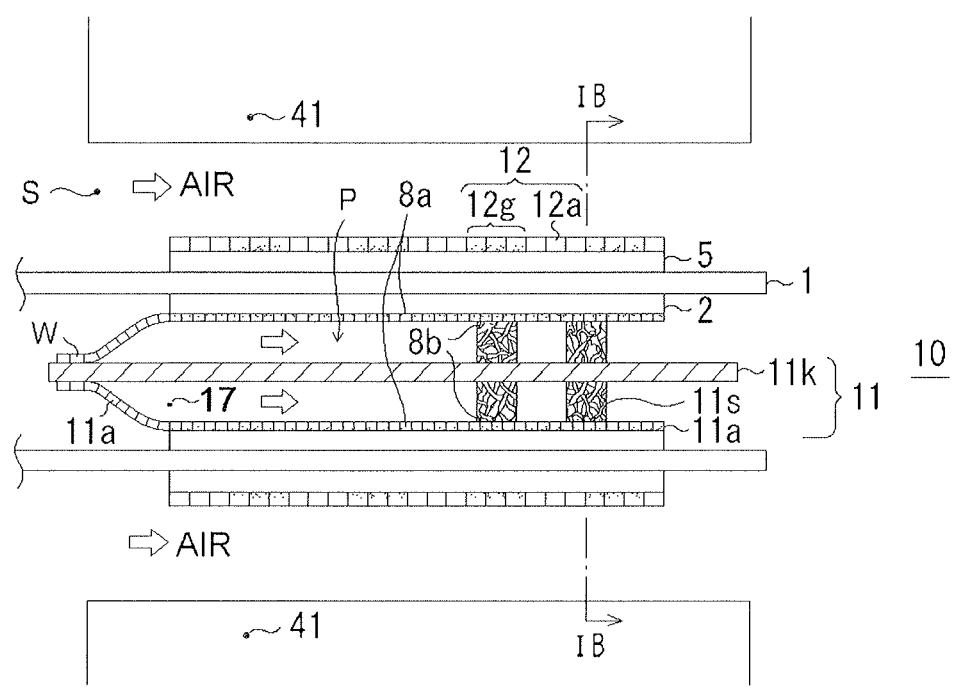
FIG. 12A is a longitudinal sectional view of a gas decomposition component according to another embodiment of the present invention, in particular, an ammonia decomposition component.

<Anode Collector 11>: Ni Mesh Sheet 11a/Porous Metal Body 11s/Central Conductive Rod 11k A Ni mesh sheet 11a is in electrical contact with an anode 2 disposed on the inner-surface side of a cylindrical MEA 7, to conduct electricity through a porous metal body 11s to a central conductive rod 11k. As illustrated in FIG. 12A, on an inlet-17 side, the Ni mesh sheet 11a has a portion extending beyond the MEA 7 and a tip W of the portion is electrically connected to the central conductive rod 11k. Accordingly, the Ni mesh sheet 11a has, in parallel, (1) an electric conduction path of Ni mesh sheet 11a/porous metal body 11s/central conductive rod 11k and (2) an electric conduction path of Ni mesh sheet/central conductive rod 11k. As a result, the Ni mesh sheet 11a disposed on the inner surface of the cylindrical MEA 7 can maintain a low electric resistance and can also suppress an increase in the pressure loss. This structure serves as the base of the third embodiment. This respect will be described in detail below.

The porous metal body 11s is preferably a metal-plated body that can be formed so as to have a high porosity such as Celmet (registered trademark: Sumitomo Electric Industries, Ltd.) for the purpose of decreasing the pressure loss of an ammonia-containing gaseous fluid. On the inner-surface side of the cylindrical MEA, it is important that, while the overall electric resistance of the collector 11 formed of a plurality of members is made low, the pressure loss in the introduction of a gaseous fluid on the anode side is made low.

The anode 2 and the Ni mesh sheet 11a are joined together by application of Ni paste and subsequent reduction sintering; sintered Ni paste 8a is disposed between the anode 2 and the Ni mesh sheet 11a. Similarly, Ni paste 8b having been subjected to reduction sintering is disposed between the porous metal body 11s and the Ni mesh sheet 11a.

<Cathode Collector 12>: Silver-Paste-Coated Wiring 12g+Ni Mesh Sheet 12a

A Ni mesh sheet 12a is in contact with the outer surface of the cylindrical MEA 7 to conduct electricity to the external wiring. Silver-paste-coated wiring 12g contains silver serving as a catalyst for promoting decomposition of oxygen gas into oxygen ions in the cathode 5 and also contributes to a decrease in the electric resistance of the cathode collector 12. The cathode 5 may be formed so as to contain silver. However, the silver-paste-coated wiring 12g having predetermined properties in the cathode collector 12 allows passing of oxygen molecules therethrough and contact of silver particles with the cathode 5. Thus, catalysis similar to that provided by silver particles contained in the cathode 5 is exhibited. In addition, this is less expensive than the case where the cathode 5 is formed so as to contain silver particles.

The Ni mesh sheet 12a may be covered with a silver-plated layer irrespective of the presence or absence of the silver-paste-coated wiring 12g. The silver-plated layer functions as a catalyst that promotes decomposition of oxygen molecules in the cathode 5. In addition, the silver-plated layer has a low electric resistance, resulting in a decrease in the electric resistance of the cathode collector 12. Although the silver-plated layer is effectively used in conjunction with the silver-paste-coated wiring 12g, the silver-paste-coated wiring 12g may be omitted.

<Features of Gas Decomposition Component of Third Embodiment>

Features of the gas decomposition component 10 according to the present embodiment are as follows.

(1) The Ni mesh sheet is disposed over the entirety of the anode 2 so as to cover the anode 2. The Ni mesh sheet 11a is disposed between the anode 2 and the porous metal body 11s.

(2) The Ni mesh sheet 11a has a portion extending beyond the MEA 7. This extension portion is welded to the central conductive rod 11k by resistance welding. The Ni mesh sheet 11a is bonded through a welding portion W to the central conductive rod 11k.

(3) The porous metal body 11s is discontinuously disposed in a gaseous-fluid passage P. The proportion of the porous metal body 11s with respect to the entire length of the passage P is about 20%, which is very low. The role of the porous metal body 11s is, in the anode collector 11, to maintain a low electric resistance and to prevent the gaseous fluid from passing without being treated. The gaseous fluid can be prevented from passing without being treated by, for example, making the gaseous fluid containing a gas to be decomposed be a turbulent flow for the purpose of increasing the probability of contacting the gaseous fluid with the anode 2.

It is important that, while the gaseous fluid is prevented from passing without being treated, the pressure loss is not increased. When the proportion of the porous metal body 11s with respect to the entire length of the passage P is adjusted to be about 20%, this adjustment considerably contributes to a decrease in the pressure loss.

The above-described features can provide the following remarkable effects.

(E1) The Ni mesh sheet 11a is disposed between the anode 2 and the porous metal body 11s to thereby increase the electric conductivity between the anode 2 and the porous metal body 11s. This is because the Ni mesh sheet 11a has a smooth surface and conforms to another member to achieve a good contact with the member, whereas the porous metal body, in particular, the Celmet 11s is wound around the central conductive rod 11k to have a spiral form and is constituted by aggregation of fine dendritic portions.

(E2) As an electric conduction path from the anode 2 to the central conductive rod 11k, to an electric conduction path (anode 2/Ni mesh sheet 11a/porous metal body 11s/central conductive rod 11k), an electric conduction path (anode 2/Ni mesh sheet 11a/central conductive rod 11k) is added in parallel. As a result, the electric resistance of the anode collector 11 can be markedly decreased.

(E3) Owing to the decrease in the electric resistance in (E2) above, the length of the porous metal body 11s with respect to the length of the passage P can be decreased. As described above, the proportion of the total length of the porous metal body 11s with respect to the entire length of the passage P can be made to be about 20%. As a result, the pressure loss in the passage P can be markedly decreased. Furthermore, the porous metal body 11s is discontinuously disposed as described above and is mainly disposed in a high-temperature region in which the decomposition electrochemical reaction proceeds at a high rate (the temperature becomes higher on the gas-outlet side than on the gas-inlet side).

Hereinafter, the Ni mesh sheet 11a will be described further in detail. The above-described effect (E1) will be first described.

When the Ni mesh sheet 11a is not used, the porous metal body 11s is in direct contact with the anode 2. In this case, even when the porous metal body 11s is constituted by a metal-plated body such as Celmet, the contact resistance becomes high. The metal-plated body has the shape of a sheet having a predetermined thickness; microscopically, dendritic metal forms a network structure. When a metal-plated body is inserted as a first-electrode collector on the inner-surface side of the cylindrical-body MEA, the above-described sheet-shaped metal-plated body is spirally wound and inserted such that the axial center of the spiral extends along the axial center of the cylindrical-body MEA. In the outer circumferential surface of the spiral sheet, the outermost edge or the generatrix portions at predetermined positions in the spiral tend to be in contact with the inner surface of the cylinder; however, portions positioned inside relative to the above-described portions tend to be separated from the first electrode because of the shape of not a non-concentric circle but a spiral. Accordingly, a sufficiently large contact area is less likely to be achieved between the porous metal body and the first electrode. Likewise, regarding contact pressure, a sufficiently high contact pressure can be ensured in the predetermined generatrix portions, whereas the contact pressure of portions positioned inside relative to the above-described portions becomes insufficient. Accordingly, when electrical connection is achieved by direct contact between the porous metal body and the first electrode, the contact resistance becomes high, resulting in an increase in the electric resistance of the first-electrode collector. An increase in the electric resistance of the collector results in degradation of the electrochemical-reaction performance. To make matters worse, in order to increase the contact area, the porous metal body 11s is conventionally arranged continuously over the entire length of the anode 2. This arrangement of the porous metal body 11s continuously over the entire length results in an increase in the pressure loss of the introduced gaseous fluid.

In contrast, by using a Ni mesh sheet, the contact resistance can be decreased in the following manner. Specifically, since the Ni mesh sheet 11a has the shape of a single sheet, the entire circumference of the Ni mesh sheet 11a naturally comes in contact with the cylindrical inner surface of the first electrode. As a result of, for example, application of an external force (compressive) for filling the cylindrical body and adjustment of increasing the amount of materials for the filling, the metal mesh sheet 11a and the metal-plated body 11s conform to each other and protrude to the anode 2, resulting in an increase in the contact area with the anode 2. At the contact interface between the metal mesh sheet 11a and the metal-plated body 11s, the metal dendritic structures are pressed against each other and enter each other's pores to thereby achieve contact with each other. Accordingly, a low contact resistance is maintained.

The Ni pastes 8a and 8b are placed at the interfaces among anode 2/Ni mesh sheet 11a/metal-plated body 11s and subjected to reduction sintering to thereby further decrease the electric resistance. The reduction sintering will be described below.

As described above, even when a metal-plated body Celmet (registered trademark) is used as the porous metal body 11s, the absence of a Ni mesh sheet results in a relatively high contact resistance: the electric resistance between the cathode collector 12 and the anode collector 11 of the gas decomposition component 10 is, for example, about 4 to about 7Ω. By inserting the Ni mesh sheet 11a into this structure, placing the Ni pastes 8a and 8b, and conducting reduction sintering, the electric resistance can be decreased to about 1Ω or less, that is, decreased by a factor of about 4 or more.

FIGS. 4A and 4B illustrate the Ni mesh sheets 11a. As for FIG. 4A, a single-phase Ni sheet is perforated to form the mesh structure. FIG. 4B illustrates a woven fabric having a mesh structure formed by knitting Ni wires. Alternatively, a nonwoven fabric (not shown) may be used that is formed by preparing and pressing cotton-shaped fibers. Although all these fabrics may be used as the Ni mesh sheets 11a, woven fabrics are preferred in view of, for example, flexibility and uniform distribution of pore size. In FIG. 4, although the Ni mesh sheets 11a do not have the shape of a cylinder, in the actual gas decomposition component 10, such a sheet having the shape of an incomplete cylinder whose top portion is somewhat open may be used.

The material of the mesh sheet will be described. In the above description, the term "Ni mesh sheet 11a" has been used. However, the material of the mesh sheet is not limited to Ni. Preferred examples of the material include Ni, Ni—Fe, Ni—Co, Ni—Cr, and Ni—W. The mesh sheet may have a structure in which a plated layer is composed of such a metal or an alloy. For example, an Fe woven fabric plated with Ni may be used; it forms an alloy by heating, that is, Ni—Fe alloy. In bonding of such a metal or an alloy to the first electrode, a reducing atmosphere for the metal forming the mesh sheet can be relatively easily achieved without employing very strict sealing conditions. Thus, reduction bonding to the first electrode can be readily performed. In particular, Ni—W and the like have excellent catalysis and can promote decomposition of, for example, ammonia.

The term "Ni mesh sheet" used hereafter also denotes a mesh sheet composed of such a material.

Figure 13:
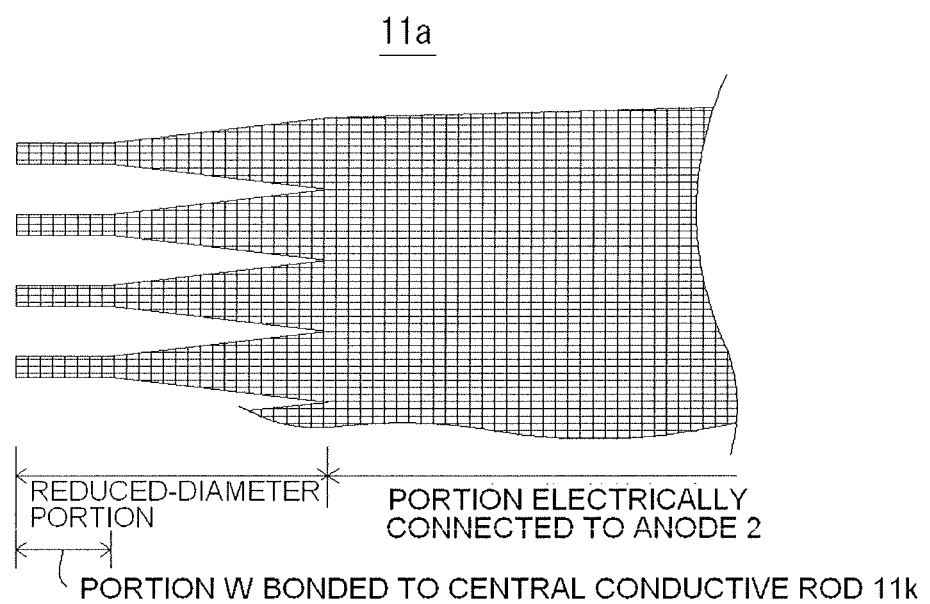
FIG. 13 illustrates an end portion of a Ni mesh sheet.

FIG. 13 illustrates the shape of an end portion of the Ni mesh sheet 11a. As illustrated in FIG. 12A, for the purpose of welding the Ni mesh sheet 11a to the central conductive rod 11k, diameter reduction needs to be performed. The portion W to be welded is brought into contact with the outer circumference of the central conductive rod 11k and preferably welded by resistance welding. The welding points in the resistance welding are preferably about four points positioned at regular intervals on the outer circumference of the central conductive rod 11k. Instead of the resistance welding, TIG welding or MIG welding may be performed; however, a welding material and a shield gas are required and the heat input is high and hence the central conductive rod may deform; accordingly, the resistance welding is preferably employed. By conducting the resistance welding to bond the Ni mesh sheet 11a and the central conductive rod 11k, a bonding portion having a high strength and a low electric resistance can be obtained.

Figure 12B:
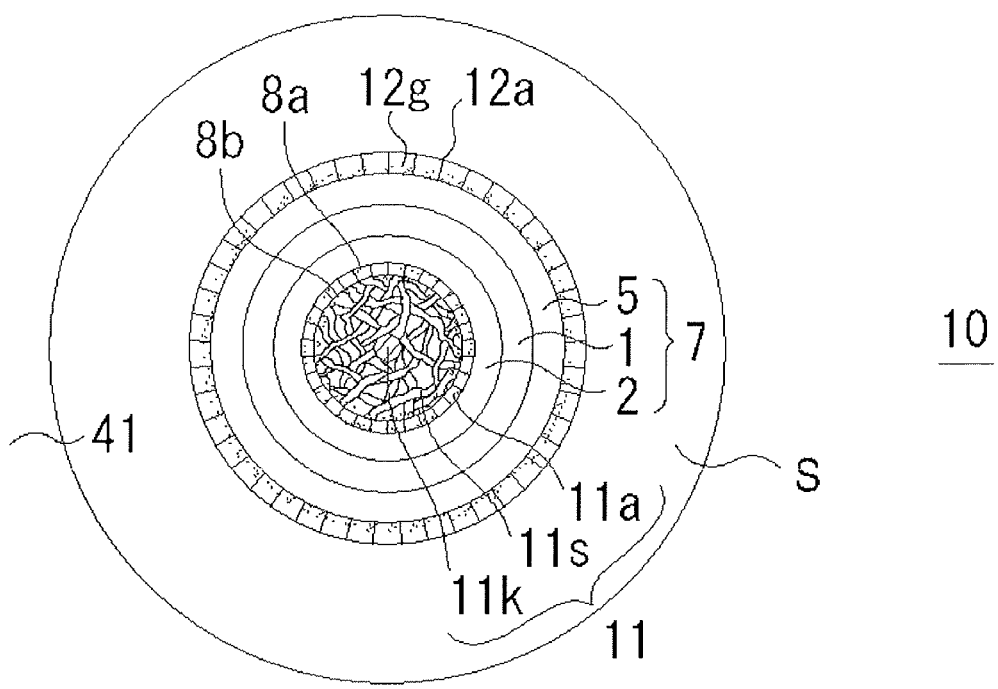
FIG. 12B is a sectional view taken along line IB-IB in FIG. 12A.
Figure 14:
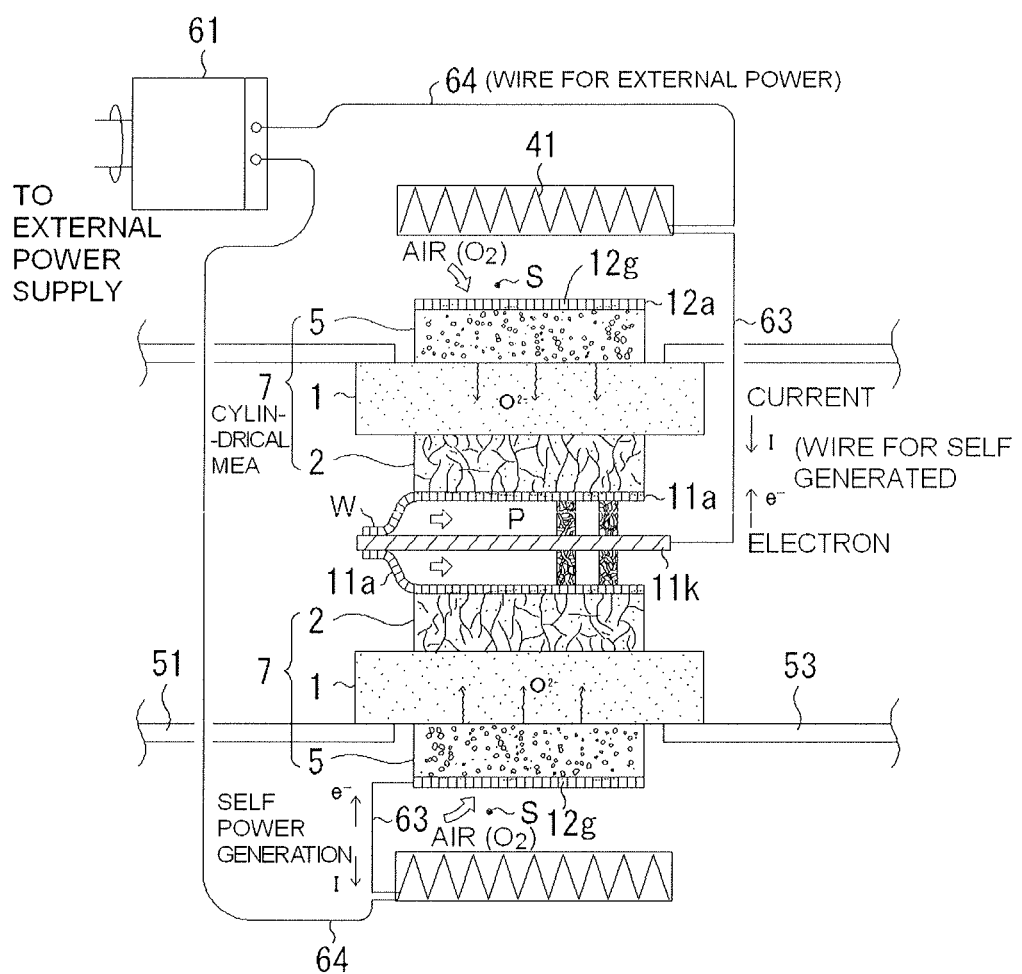
FIG. 14 illustrates the electric wiring system of the gas decomposition component in FIGS. 12A and 12B.

FIG. 14 illustrates the electric wiring system of the gas decomposition component 10 in FIG. 12 when the solid electrolyte is oxygen-ion conductive. An ammonia-containing gaseous fluid is introduced, in a highly airtight manner, into the inner cylinder of the cylindrical MEA 7, that is, the space where the anode collector 11 is disposed. When the cylindrical MEA 7 is used, since the gaseous fluid is passed on the inner-surface side, it is important to use the porous metal body 11s, as described above, a metal-plated body, such as Celmet. As described above, in the present embodiment, the Celmet 11s is discontinuously disposed at intervals; and the proportion of the length of the Celmet 11s with respect to the passage P is about 20%.

While the ammonia-containing gaseous fluid passes through pores in the Ni mesh sheet 11a and the porous metal 11s, it also comes into contact with the anode 2, resulting in an ammonia decomposition reaction described below. Oxygen ions $O^{2-}$ are generated by an oxygen gas decomposition reaction in the cathode and pass through the solid electrolyte 1 to reach the anode 2. That is, this is an electrochemical reaction when oxygen ions, which are anions, move through the solid electrolyte.

(Anode reaction): $2NH_3 + 3O^{2-} \rightarrow N_2 + 3H_2O + 6e^-$

Specifically, a portion of ammonia reacts: $2NH_3 \rightarrow N_2 + 3H_2$. These $3H_2$ react with the oxygen ions $3O^{2-}$ to generate $3H_2O$.

The air, in particular, oxygen gas is passed through a space S and introduced into the cathode 5. Oxygen ions dissociated from oxygen molecules in the cathode 5 are sent to the solid electrolyte 1 toward the anode 2. The cathode reaction is as follows.

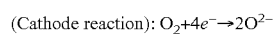
(Cathode reaction): $O_2 + 4e^- \rightarrow 2O^{2-}$

As a result of the electrochemical reaction, electric power is generated; a potential difference is generated between the anode 2 and the cathode 5; current I flows from the cathode collector 12 to the anode collector 11. When a load, such as a heater 41 for heating the gas decomposition component 10, is connected between the cathode collector 12 and the anode collector 11, electric power for the heater 41 can be supplied. This supply of electric power to the heater 41 may be a partial supply. Rather, in most cases, the amount of supply from the self power generation is equal to or lower than half of the overall electric power required for the heater.

The above-described electrochemical reaction is one in which oxygen ions, which are anions, move through the solid electrolyte 1. In another desirable embodiment according to the present invention, for example, the solid electrolyte 1 may be composed of barium zirconate ($BaZrO_3$) and a reaction is caused in which protons are generated in the anode 2 and moved through the solid electrolyte 1 to the cathode 5.

When a proton-conductive solid electrolyte 1 is used, for example, in the case of decomposing ammonia, ammonia is decomposed in the anode 2 to generate protons, nitrogen molecules, and electrons; the protons are moved through the solid electrolyte 1 to the cathode 5; and, in the cathode 5, the protons react with oxygen to generate water ($H_2O$). Since protons are smaller than oxygen ions, they move through the solid electrolyte at a higher speed than oxygen ions. Accordingly, while the heating temperature can be decreased, the decomposition capacity on the practical level can be achieved.

In addition, the solid electrolyte 1 can be easily formed so as to have a thickness providing a sufficient strength.

For example, when ammonia is decomposed with a cylindrical-body MEA, an anode is disposed inside the cylindrical-body MEA, and an oxygen-ion-conductive solid electrolyte is used, a reaction generating water occurs inside the cylindrical body (in the anode). The water takes the form of water droplets at low-temperature portions near the outlet of the cylindrical-body MEA and may cause pressure loss. In contrast, when a proton-conductive solid electrolyte is used, protons, oxygen molecules, and electrons react in the cathode (outside) to generate water. Since the outside is substantially open, even when water droplets adhere to low-temperature portions near the outlet, pressure loss is less likely to be caused.

Figure 15:
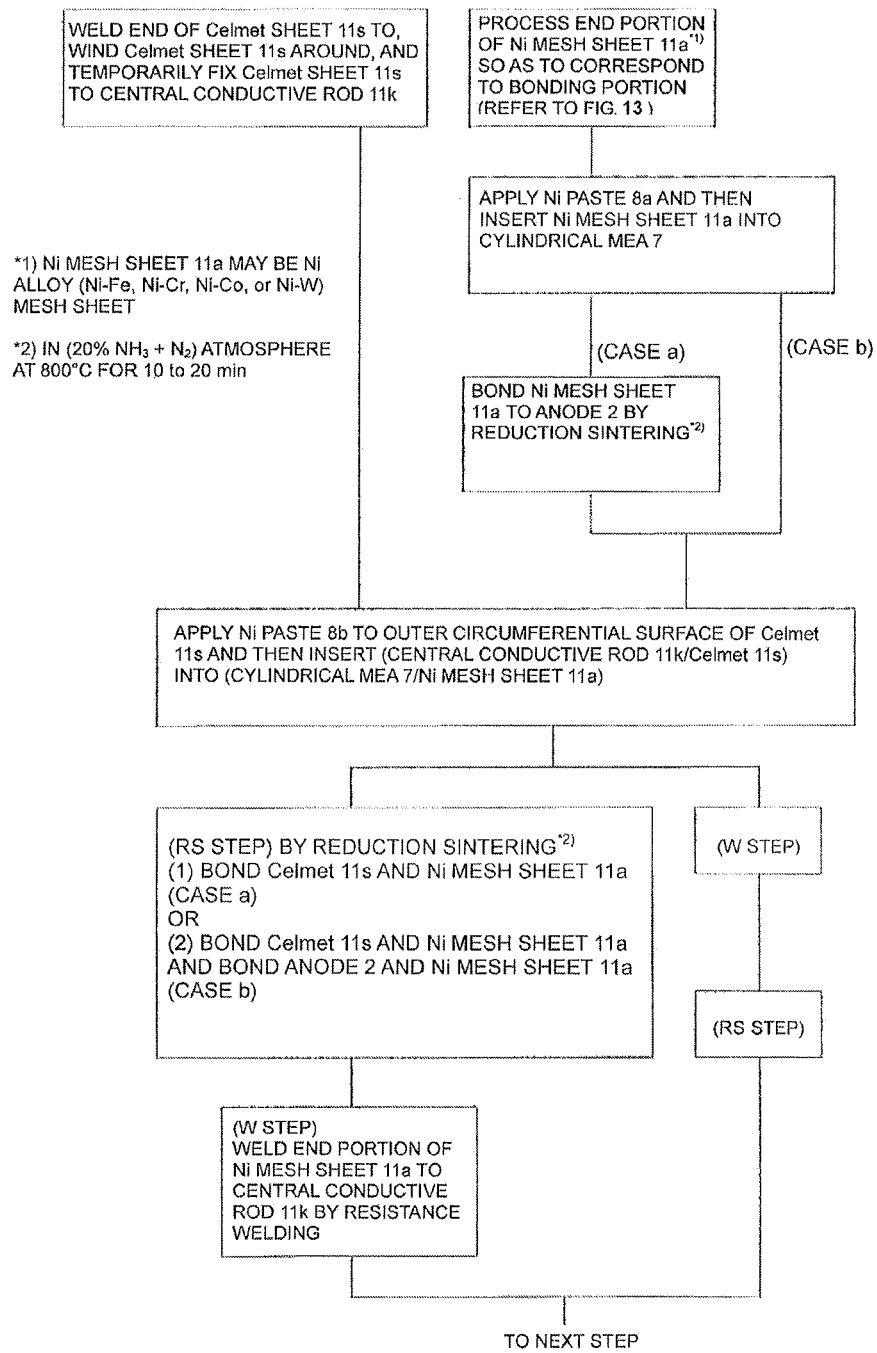
FIG. 15 illustrates a method for forming an anode collector.

Hereinafter, referring to FIG. 15, a method for forming the anode collector 11 with the cylindrical MEA 7, the Ni mesh sheet 11a, the Celmet (porous metal body) 11s, and the central conductive rod 11k will be described. A method for producing the cylindrical MEA is the same as described above. An end portion of the Ni mesh sheet 11a is first processed as illustrated in FIG. 13. The Ni mesh sheet 11a is coated with the Ni paste 8a and then inserted into the cylindrical MEA 7. Immediately, reduction sintering may be performed to bond anode 2/Ni mesh sheet 11a. Alternatively, anode 2/Ni mesh sheet 11a in the temporarily bonded state may be left without being subjected to reduction sintering.

A start-of-winding portion of the Celmet sheet 11s is fixed to the central conductive rod 11k by resistance welding, and the Celmet sheet 11s is wound and temporarily bonded. The outer surface of the thus-wound Celmet 11s is coated with the Ni paste 8b, and the Celmet 11s is inserted into the above-described cylindrical MEA 7 having the Ni mesh sheet 11a. Immediately, reduction sintering (RS step) is performed to bond the Celmet 11s and the Ni mesh sheet 11a together. When the Ni mesh sheet 11a and the anode 2 have not been subjected to reduction sintering up to this time (RS step), in this (RS step), the Ni mesh sheet 11a and the anode 2 are simultaneously subjected to reduction sintering. Subsequently, (W step) the extension portion (end portion) W of the Ni mesh sheet 11a is placed on the outer circumference of the central conductive rod 11k and welded by resistance welding. The order of (RS step) and (W step) may be inverted. Thus, the anode collector 11 is formed and the next step is performed.

The resistance welding may be performed, for example, under the following conditions. Resistance welding machine manufactured by MIYACHI CORPORATION; welding source: IS-120B; welding transformer: ITH-651A6W6; welding head: MH-D500C; welding conditions: current 6.0 kA×pressure 25.0 N Reduction-sintering conditions are holding in a 20%-$NH_3$ nitrogen atmosphere at 800° C. for 10 to 20 minutes.

Figure 16:
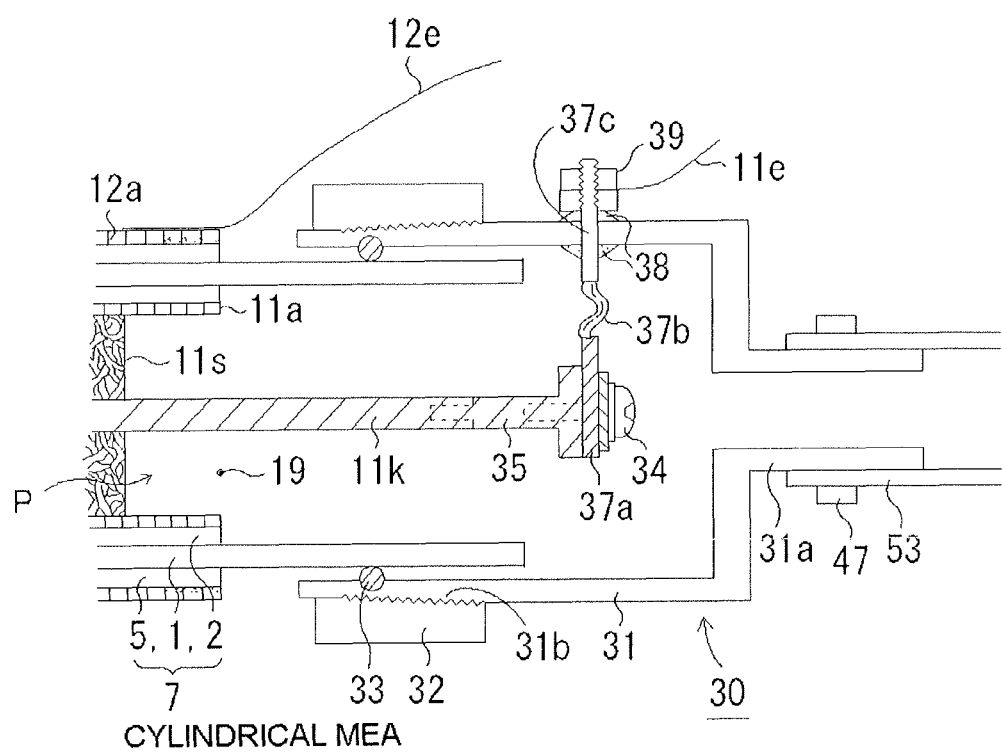
FIG. 16 illustrates a state in which an external wire and a gaseous-fluid transfer passage are connected to a cylindrical MEA.

FIG. 16 illustrates a connection state between the central conductive rod 11k and an external wire 11e and a connection state between the cylindrical MEA 7 and an exhaust passage after decomposition 53. A tubular joint 30 formed of a fluorocarbon resin is engaged with the end of the cylindrical MEA 7. The engagement is performed such that the following state is maintained: an O-ring 33 contained on the inner-surface side of an engagement portion 31b extending from a body portion 31 of the tubular joint 30 to the solid electrolyte 1 butts against the outer surface of the solid electrolyte 1 composed of a ceramic, which is a sinter. Accordingly, the engagement portion 31b of the tubular joint 30 is formed so as to have an outer diameter that changes in a tapered manner. The tapered portion is threaded and, to this thread, a circular nut 32 is screwed. By screwing the circular nut in the direction in which the outer diameter increases, the engagement portion 31b is tightened in its outer surface. Thus, the airtightness provided with the O-ring 33 can be adjusted.

In the body portion 31 of the tubular joint 30, a conductive penetration part 37c that penetrates the body portion 31 in an airtight manner is provided. To ensure the airtightness, for example, a sealing resin 38 is applied. The conductive penetration part 37c is preferably a cylindrical rod threaded for screwing a nut 39 for the purpose of ensuring electrical connection with the external wire 11e. To the intra-tube end of the conductive penetration part 37c, a conductive lead 37b is connected. Another end of the conductive lead 37b is connected to a connection plate 37a.

Electrical connection between the connection plate 37a and a tip portion 35 of the central conductive rod 11k is established by using a connection tool such as a screwdriver and tightening a screw 34 with the screwdriver inserted into a protrusion hole portion 31a of the tubular joint 30. By tightening the screw 34 with the screwdriver, the electric resistance (contact resistance) in the electrical connection between the tip portion 35 and the connection plate 37a can be substantially eliminated.

By winding an external wire 12e around the outer circumference of an end portion of the Ni mesh sheet 12a of the cathode collector 12, connection to the outside can be established. Since the cathode 5 is positioned on the outer-surface side of the cylindrical MEA 7, the establishment of the connection is less difficult than that from the anode collector 11 to the outside.

The exhaust passage after decomposition 53 is preferably an elastically deformable tube composed of, for example, a resin. The tube 53 is engaged around the outer circumference of the protrusion hole portion 31a and fastened with a fastener 47. As a result, a connection that is highly airtight can be obtained.

In FIG. 16, both of the connection between the anode collector 11 and the external wire 11e and the connection between the tubular joint 30 and the exhaust passage after decomposition 53 are achieved by very simple and small structures. In addition, these two connections are disposed at positions that are separated from the main stream of thermal flow from the heater, by using the central conductive rod 11k and the tip portion 35 attached thereto. Accordingly, use of a fluorocarbon resin, which is an ordinary heat- or corrosion-resistant resin, can ensure durability for repeated use for a long period of time. For confirmation, it is noted that the central conductive rod 11k is electrically connected to the porous metal body 11s with a low contact resistance as described above.

As for structures, components, and the like that are not particularly specified above (such as, the central conductive rod 11k, the silver-paste-coated wiring 12g, the anode 2, the metal chain particles 21, the cathode 5, the solid electrolyte 1, the metal-plated body 11s, the method for producing the cylindrical MEA 7, and arrangement of gas decomposition components), those described in the first embodiment can be employed.

(Another Gas Decomposition Component)

Table I describes examples of other gas decomposition reactions to which a gas decomposition component according to the present invention can be applied. A gas decomposition reaction R1 is an ammonia/oxygen decomposition reaction described in the first and third embodiments. In addition, a gas decomposition component according to the present invention can be applied to all the gas decomposition reactions R2 to R8: specifically, ammonia/water, ammonia/NOx, hydrogen/oxygen/, ammonia/carbon dioxide, VOC (volatile organic compounds)/oxygen, VOC/NOx, water/NOx, and the like. In any of the reactions, the first electrode is not limited to an anode and may be a cathode. This cathode and the other electrode are made to constitute a pair.

TABLE I

| | Item | | | |
|---|---|---|---|---|
| Number | Gas introduced into anode | Moving ion | Gas introduced into cathode | Electrochemical reaction |
| R1 | $NH_3$ | $O^{2-}$ | $O_2$ | Power generation |
| R2 | $NH_3$ | $O^{2-}$ | $H_2O$ | Power generation |
| R3 | $NH_3$ | $O^{2-}$ | $NO_2, NO$ | Power generation |
| R4 | $H_2$ | $O^{2-}$ | $O_2$ | Power generation |
| R5 | $NH_3$ | $O^{2-}$ | $CO_2$ | Electrolysis (supply of electric power) |
| R6 | VOC such as $CH_4$ | $O^{2-}$ | $O_2$ | Power generation |
| R7 | VOC such as $CH_4$ | $O^{2-}$ | $NO_2, NO$ | Electrolysis (supply of electric power) |
| R8 | $H_2O$ | $O^{2-}$ | $NO_2, NO$ | Electrolysis (supply of electric power) |

Table I merely describes several examples of a large number of electrochemical reactions. A gas decomposition component according to the present invention is also applicable to a large number of other reactions. For example, the reaction examples in Table I are limited to examples in which oxygen-ion-conductive solid electrolytes are employed. However, as described above, reaction examples in which proton ($H^+$)-conductive solid electrolytes are employed are also major embodiments of the present invention. Even when a proton-conductive solid electrolyte is employed, in the combinations of gases described in Table I, the gas molecules can be finally decomposed, though the ion species passing through the solid electrolyte is proton. For example, in the reaction (R1), in the case of a proton-conductive solid electrolyte, ammonia ($NH_3$) is decomposed in the anode into nitrogen molecules, protons, and electrons; the protons move through the solid electrolyte to the cathode; the electrons move through the external circuit to the cathode; and, in the cathode, oxygen molecules, the electrons, and the protons generate water molecules. In view of the respect that ammonia is finally combined with oxygen molecules and decomposed, this case is the same as the case where an oxygen-ion-conductive solid electrolyte is employed.

Other Application Examples

The above-described electrochemical reactions are gas decomposition reactions intended for gas detoxification. There are also gas decomposition components whose main purpose is not gas detoxification. A gas decomposition component according to the present invention is also applicable to such electrochemical reaction apparatuses, such as fuel cells.

Embodiments of the present invention have been described so far. However, embodiments of the present invention disclosed above are given by way of illustration, and the scope of the present invention is not limited to these embodiments. The scope of the present invention is indicated by Claims and embraces all the modifications within the meaning and range of equivalency of the Claims.

INDUSTRIAL APPLICABILITY

A gas decomposition component according to the present invention can provide a small apparatus in which an electrochemical reaction is used to reduce the running cost and high treatment performance can be achieved. In particular, an ammonia decomposition component having a cylindrical MEA for ammonia is small but has high treatment performance and also has high durability even in high-temperature use for ensuring treatment capacity.

For example, in a gas decomposition component according to the present invention, an extension of a metal mesh sheet inserted for decreasing the electric resistance in the electrical connection between the first electrode and the porous metal body is electrically connected to the central conductive rod. Accordingly, the electric resistance of the first-electrode collector can be further decreased. Due to this decrease in the electric resistance, the length of the porous metal body in the gas passage can be reduced and hence an increase in the pressure loss can be suppressed. As a result, a small apparatus can be provided that has high gas treatment performance and can be operated at low running cost.

REFERENCE SIGNS LIST 1 solid electrolyte
2 anode
2h pore in anode
5 cathode
5c ion-conductive ceramic in cathode
8a, 8b Ni paste
10 gas decomposition component
11 anode collector
11a Ni mesh sheet
11e anode external wire
11g Ni paste layer
11k central conductive rod
11s porous metal body (metal-plated body)
12 cathode collector
12a Ni mesh sheet
12e cathode external wire
12g silver-paste-coated wiring
21 metal chain particle
21a core portion (metal portion) of metal chain particle
21b oxide layer
22 ion-conductive ceramic in anode
30 tubular joint
31 body portion of tubular joint
31a protrusion hole portion
31b engagement portion
32 circular nut
33 O-ring
34 screw
35 tip portion of central conductive rod
37a connection plate
37b conductive lead 37c conductive penetration part
39 nut
45 gaseous-fluid transfer passage
47 fastener
41 heater
51 exhaust passage before decomposition
53 exhaust passage after decomposition
61 control panel
63 wire for generated power
64 wire for external power
P gaseous-fluid passage (in MEA)
S air space
W welding portion of Ni mesh sheet

The invention claimed is:

1. A gas decomposition component used for decomposing a gas, comprising:
   a cylindrical-body membrane electrode assembly (MEA) including a first electrode on an inner-surface side, a second electrode on an outer-surface side, and a solid electrolyte sandwiched between the first electrode and the second electrode;
   a porous metal body that is inserted on the inner-surface side of the cylindrical-body MEA and is electrically connected to the first electrode; and
   a central conductive rod inserted so as to serve as an electrically conductive shaft of the porous metal body,
   wherein the solid electrolyte extends beyond both ends of the cylindrical-body MEA, a tubular joint is engaged with each of ends of the cylindrical solid electrolyte, the tubular joint is connected to a transfer passage for a gaseous fluid containing the gas supplied to the first electrode, and a conductive member is electrically connected to the central conductive rod and penetrates the tubular joint.

2. The gas decomposition component according to claim 1, wherein the central conductive rod is a single-phase or composite-phase metal rod in which at least a surface layer does not contain Cr.

3. The gas decomposition component according to claim 1, wherein the tubular joint is formed of a resin having heat resistance and corrosion resistance.

4. The gas decomposition component according to claim 1, wherein the first electrode and/or the second electrode is a sinter containing an ion-conductive ceramic and metal chain particles mainly containing nickel (Ni).

5. The gas decomposition component according to claim 1, wherein the solid electrolyte has oxygen-ion conductivity or proton conductivity.

6. The gas decomposition component according to claim 1, wherein the porous metal body is a metal-plated body.

7. The gas decomposition component according to claim 1, wherein a first gaseous fluid is introduced into the first electrode, a second gaseous fluid is introduced into the second electrode, and electric power is output from the first electrode and the second electrode.

8. The gas decomposition component according to claim 7, further comprising a heater, wherein the electric power is supplied to the heater.

9. An ammonia decomposition component comprising the gas decomposition component according to claim 1, wherein a gaseous fluid containing ammonia is introduced into the first electrode and a gaseous fluid containing oxygen molecules is introduced into the second electrode.

10. The gas decomposition component according to claim 1, wherein a third gaseous fluid is introduced into the first electrode, a fourth gaseous fluid is introduced into the second electrode, and electric power is supplied to the first electrode and the second electrode.

11. A power generation apparatus comprising the gas decomposition component according to claim 7 and a power-supply part that supplies the electric power to another electric apparatus.

12. An electrochemical reaction apparatus for fluid, comprising the gas decomposition component according to claim 1.

13. A gas decomposition component used for decomposing a gas, comprising:
    a cylindrical-body membrane electrode assembly (MEA) including a first electrode on an inner-surface side, a second electrode on an outer-surface side, and a solid electrolyte sandwiched between the first electrode and the second electrode;
    a heater that heats the MEA;
    a porous metal body that is inserted on the inner-surface side of the cylindrical-body MEA and is electrically connected to the first electrode;
    a central conductive rod inserted so as to serve as an electrically conductive shaft of the porous metal body; and
    a metal mesh sheet inserted between the first electrode and the porous metal body,
    wherein the metal mesh sheet includes a portion extending beyond an end of the MEA, and the portion extending beyond the end is electrically connected to the central conductive rod,
    wherein the gas decomposition component comprises, in parallel: (1) an electric conduction path including the mesh sheet, the porous metal body, and central conductive rod, and (2) an electric conduction path including the mesh sheet and the central conductive rod.

14. The gas decomposition component according to claim 13, wherein the metal mesh sheet has a cylindrical shape and is disposed all over the first electrode so as to cover the first electrode.

15. The gas decomposition component according to claim 14, wherein a diameter of the portion of the metal mesh sheet extending beyond the end is reduced and the portion is welded to an outer circumference of the central conductive rod.

16. The gas decomposition component according to claim 13, wherein the portion of the metal mesh sheet extending beyond the end is bonded to an outer circumference of the central conductive rod by resistance welding at one or more points.

17. The gas decomposition component according to claim 13, wherein the metal mesh sheet is electrically connected to the central conductive rod on an inlet side and/or an outlet side of the MEA into which a gaseous fluid containing the gas is introduced.

18. The gas decomposition component according to claim 13, wherein Ni paste is disposed between the porous metal body and the metal mesh sheet.

19. The gas decomposition component according to claim 13, wherein the gas to be decomposed is discharged from semiconductor fabrication equipment and contains at least ammonia.

20. The gas decomposition component according to claim 13, wherein electric power is output from the first electrode and the second electrode and supplied to the heater.

21. The gas decomposition component according to claim 13, wherein the gas decomposition component comprises a fuel cell for supplying electric power to an external apparatus.

22. The gas decomposition component according to claim 13, wherein the metal mesh sheet includes a portion having a cylindrical shape that does not extend beyond the end of the MEA, and wherein the portion of the metal mesh sheet extending beyond the end of the MEA has a diameter that is less than a diameter of the portion of the mesh sheet that does not extend beyond the end of the MEA.

23. The gas decomposition component according to claim 13, wherein the portion of the metal mesh sheet extending beyond the MEA has a cylindrical shape with an inner circumferential surface portion that contacts all of an outer circumferential surface of the central conductive rod along a length of the central conductive rod.

* * * * *